United States Patent
Amtrup et al.

(10) Patent No.: US 9,584,729 B2
(45) Date of Patent: Feb. 28, 2017

(54) SYSTEMS AND METHODS FOR IMPROVING VIDEO CAPTURED USING MOBILE DEVICES

(71) Applicant: Kofax, Inc., Irvine, CA (US)

(72) Inventors: Jan W. Amtrup, Silver Spring, MD (US); Jiyong Ma, San Diego, CA (US); Anthony Macciola, Irvine, CA (US)

(73) Assignee: Kofax, Inc., Irvine, CA (US)

( * ) Notice: Subject to any disclaimer, the term of this patent is extended or adjusted under 35 U.S.C. 154(b) by 0 days.

(21) Appl. No.: 14/981,759

(22) Filed: Dec. 28, 2015

(65) Prior Publication Data

US 2016/0112645 A1 Apr. 21, 2016

Related U.S. Application Data

(63) Continuation of application No. 14/473,950, filed on Aug. 29, 2014, now Pat. No. 9,253,349, which is a
(Continued)

(51) Int. Cl.
*H04N 1/04* (2006.01)
*H04N 5/232* (2006.01)
(Continued)

(52) U.S. Cl.
CPC .......... *H04N 5/23293* (2013.01); *G06K 9/18* (2013.01); *G06K 9/2063* (2013.01);
(Continued)

(58) Field of Classification Search
CPC .......... H04N 5/23293; H04N 5/23206; H04N 5/23222; H04N 5/264
(Continued)

(56) References Cited

U.S. PATENT DOCUMENTS 3,069,654 A 12/1962 Hough
4,656,665 A 4/1987 Pennebaker
(Continued)

FOREIGN PATENT DOCUMENTS

EP 0549329 A2 6/1993
EP 0723247 A1 7/1996
(Continued)

OTHER PUBLICATIONS

International Search Report and Written Opinion from International Application No. PCT/US2014/065831, dated Feb. 26, 2015.
(Continued)

*Primary Examiner* — Houshang Safaipour
(74) *Attorney, Agent, or Firm* — Zilka-Kotab, PC

(57) ABSTRACT

Systems, methods, and computer program products for capturing and analyzing image data, preferably video data, are disclosed. The inventive concepts include using multiple frames of image data to generate a composite image, where the composite image may be characterized by a higher resolution than one or more of the individual frames used to generate the composite image, and/or absence of a blurred region present in one or more of the individual frames. Inventive techniques also include determining a minimum capture resolution appropriate for capturing images of particular objects for downstream processing, and optionally triggering generation of a composite image having sufficient resolution to facilitate the downstream processing in response to detecting one or more frames of image data are characterized by a resolution, and/or a region having a resolution, less than the minimum capture resolution appropriate for capturing images of those particular objects.

20 Claims, 5 Drawing Sheets

Related U.S. Application Data continuation of application No. 14/268,876, filed on May 2, 2014, now Pat. No. 8,885,229.

(60) Provisional application No. 61/819,463, filed on May 3, 2013.

(51) Int. Cl.

| | |
|---|---|
| *H04N 1/00* | (2006.01) |
| *G06K 9/18* | (2006.01) |
| *G06K 9/20* | (2006.01) |
| *G06K 9/62* | (2006.01) |
| *G06T 5/00* | (2006.01) |
| *H04N 5/265* | (2006.01) |

(52) U.S. Cl.
CPC ............ *G06K 9/6267* (2013.01); *G06T 5/001* (2013.01); *H04N 1/00251* (2013.01); *H04N 1/00307* (2013.01); *H04N 1/00801* (2013.01); *H04N 5/23222* (2013.01); *H04N 5/265* (2013.01); *H04N 5/23206* (2013.01); *H04N 2201/0032* (2013.01); *H04N 2201/0075* (2013.01); *H04N 2201/0084* (2013.01); *H04N 2201/0458* (2013.01)

(58) Field of Classification Search
USPC .............................. 358/1.15, 1.9, 473, 1.14
See application file for complete search history.

(56) References Cited

U.S. PATENT DOCUMENTS

| | | | |
|---|---|---|---|
| 4,836,026 A | 6/1989 | P'an et al. |
| 4,903,312 A | 2/1990 | Sato |
| 4,992,863 A | 2/1991 | Moriya |
| 5,020,112 A | 5/1991 | Chou |
| 5,063,604 A | 11/1991 | Weiman |
| 5,124,810 A | 6/1992 | Seto |
| 5,159,667 A | 10/1992 | Borrey et al. |
| 5,181,260 A | 1/1993 | Kurosu et al. |
| 5,202,934 A | 4/1993 | Miyakawa et al. |
| 5,220,621 A | 6/1993 | Saitoh |
| 5,268,967 A | 12/1993 | Jang et al. |
| 5,282,055 A | 1/1994 | Suzuki |
| 5,313,527 A | 5/1994 | Guberman et al. |
| 5,317,646 A | 5/1994 | Sang, Jr. et al. |
| 5,344,132 A | 9/1994 | LeBrun et al. |
| 5,353,673 A | 10/1994 | Lynch |
| 5,355,547 A | 10/1994 | Fitjer |
| 5,375,197 A | 12/1994 | Kang |
| 5,430,810 A | 7/1995 | Saeki |
| 5,467,407 A | 11/1995 | Guberman et al. |
| 5,473,742 A | 12/1995 | Polyakov et al. |
| 5,546,474 A | 8/1996 | Zuniga |
| 5,563,723 A | 10/1996 | Beaulieu et al. |
| 5,563,966 A | 10/1996 | Ise et al. |
| 5,602,964 A | 2/1997 | Barrett |
| 5,629,989 A | 5/1997 | Osada |
| 5,652,663 A | 7/1997 | Zelten |
| 5,668,890 A | 9/1997 | Winkelman |
| 5,696,611 A | 12/1997 | Wishimura et al. |
| 5,699,244 A | 12/1997 | Clark, Jr. et al. |
| 5,717,794 A | 2/1998 | Koga et al. |
| 5,721,940 A | 2/1998 | Luther et al. |
| 5,757,963 A | 5/1998 | Ozaki et al. |
| 5,781,665 A | 7/1998 | Cullen et al. |
| 5,822,454 A | 10/1998 | Rangarajan |
| 5,825,915 A | 10/1998 | Michimoto et al. |
| 5,832,138 A | 11/1998 | Nakanishi et al. |
| 5,839,019 A | 11/1998 | Ito |
| 5,848,184 A | 12/1998 | Taylor et al. |
| 5,867,264 A | 2/1999 | Hinnrichs |
| 5,937,084 A | 8/1999 | Crabtree et al. |
| 5,953,388 A | 9/1999 | Walnut et al. |
| 5,987,172 A | 11/1999 | Michael |
| 6,005,958 A | 12/1999 | Farmer et al. |
| 6,009,191 A | 12/1999 | Julier |
| 6,009,196 A | 12/1999 | Mahoney |
| 6,011,595 A | 1/2000 | Henderson et al. |
| 6,016,361 A | 1/2000 | Hongu et al. |
| 6,038,348 A | 3/2000 | Carley |
| 6,055,968 A | 5/2000 | Sasaki et al. |
| 6,067,385 A | 5/2000 | Cullen et al. |
| 6,072,916 A | 6/2000 | Suzuki |
| 6,073,148 A | 6/2000 | Rowe et al. |
| 6,098,065 A | 8/2000 | Skillen et al. |
| 6,104,830 A | 8/2000 | Schistad |
| 6,118,544 A | 9/2000 | Rao |
| 6,118,552 A | 9/2000 | Suzuki et al. |
| 6,154,217 A | 11/2000 | Aldrich |
| 6,192,360 B1 | 2/2001 | Dumais et al. |
| 6,219,158 B1 | 4/2001 | Dawe |
| 6,219,773 B1 | 4/2001 | Garibay, Jr. et al. |
| 6,223,223 B1 | 4/2001 | Kumpf et al. |
| 6,229,625 B1 | 5/2001 | Nakatsuka |
| 6,233,059 B1 | 5/2001 | Kodaira et al. |
| 6,263,122 B1 | 7/2001 | Simske et al. |
| 6,292,168 B1 | 9/2001 | Venable et al. |
| 6,327,581 B1 | 12/2001 | Platt |
| 6,337,925 B1 | 1/2002 | Cohen et al. |
| 6,347,152 B1 | 2/2002 | Shinagawa et al. |
| 6,347,162 B1 | 2/2002 | Suzuki |
| 6,356,647 B1 | 3/2002 | Bober et al. |
| 6,370,277 B1 | 4/2002 | Borrey et al. |
| 6,385,346 B1 | 5/2002 | Gillihan et al. |
| 6,393,147 B2 | 5/2002 | Danneels et al. |
| 6,408,094 B1 | 6/2002 | Mirzaoff et al. |
| 6,408,105 B1 | 6/2002 | Maruo |
| 6,424,742 B2 | 7/2002 | Yamamoto et al. |
| 6,463,430 B1 | 10/2002 | Brady et al. |
| 6,469,801 B1 | 10/2002 | Telle |
| 6,473,198 B1 | 10/2002 | Matama |
| 6,473,535 B1 | 10/2002 | Takaoka |
| 6,480,304 B1 | 11/2002 | Os et al. |
| 6,480,624 B1 | 11/2002 | Horie et al. |
| 6,501,855 B1 | 12/2002 | Zelinski |
| 6,512,848 B2 | 1/2003 | Wang et al. |
| 6,522,791 B2 | 2/2003 | Nagarajan |
| 6,525,840 B1 | 2/2003 | Haraguchi et al. |
| 6,563,531 B1 | 5/2003 | Matama |
| 6,601,026 B2 | 7/2003 | Appelt et al. |
| 6,614,930 B1 | 9/2003 | Agnihotri et al. |
| 6,621,595 B1 | 9/2003 | Fan et al. |
| 6,628,416 B1 | 9/2003 | Hsu et al. |
| 6,633,857 B1 | 10/2003 | Tipping |
| 6,643,413 B1 | 11/2003 | Shum et al. |
| 6,646,765 B1 | 11/2003 | Barker et al. |
| 6,658,147 B2 | 12/2003 | Gorbatov et al. |
| 6,665,425 B1 | 12/2003 | Sampath et al. |
| 6,667,774 B2 | 12/2003 | Berman et al. |
| 6,675,159 B1 | 1/2004 | Lin et al. |
| 6,701,009 B1 | 3/2004 | Makoto et al. |
| 6,704,441 B1 | 3/2004 | Inagaki et al. |
| 6,724,916 B1 | 4/2004 | Shyu |
| 6,732,046 B1 | 5/2004 | Joshi |
| 6,748,109 B1 | 6/2004 | Yamaguchi |
| 6,751,349 B2 | 6/2004 | Matama |
| 6,757,081 B1 | 6/2004 | Fan et al. |
| 6,757,427 B1 | 6/2004 | Hongu |
| 6,763,515 B1 | 7/2004 | Vazquez et al. |
| 6,765,685 B1 | 7/2004 | Yu |
| 6,781,375 B2 | 8/2004 | Miyazaki et al. |
| 6,788,830 B1 | 9/2004 | Morikawa |
| 6,789,069 B1 | 9/2004 | Barnhill et al. |
| 6,801,658 B2 | 10/2004 | Morita et al. |
| 6,826,311 B2 | 11/2004 | Wilt |
| 6,839,466 B2 | 1/2005 | Venable |
| 6,850,653 B2 | 2/2005 | Abe |
| 6,873,721 B1 | 3/2005 | Beyerer et al. |
| 6,882,983 B2 | 4/2005 | Furphy et al. |
| 6,898,601 B2 | 5/2005 | Amado et al. |
| 6,901,170 B1 | 5/2005 | Terada et al. |
| 6,917,438 B1 | 7/2005 | Yoda et al. |

(56) References Cited

U.S. PATENT DOCUMENTS

| | | | |
|---|---|---|---|
| 6,917,709 B2 | 7/2005 | Zelinski | |
| 6,921,220 B2 | 7/2005 | Aiyama | |
| 6,950,555 B2 | 9/2005 | Filatov et al. | |
| 6,987,534 B1 | 1/2006 | Seta | |
| 6,989,914 B2 | 1/2006 | Iwaki | |
| 7,016,549 B1 | 3/2006 | Utagawa | |
| 7,017,108 B1 | 3/2006 | Wan | |
| 7,020,320 B2 | 3/2006 | Filatov | |
| 7,023,447 B2 | 4/2006 | Luo et al. | |
| 7,027,181 B2 | 4/2006 | Takamori | |
| 7,038,713 B1 | 5/2006 | Matama | |
| 7,042,603 B2 | 5/2006 | Masao et al. | |
| 7,043,080 B1 | 5/2006 | Dolan | |
| 7,054,036 B2 | 5/2006 | Hirayama | |
| 7,081,975 B2 | 7/2006 | Yoda et al. | |
| 7,082,426 B2 | 7/2006 | Musgrove et al. | |
| 7,123,292 B1 * | 10/2006 | Seeger | G03B 5/02 348/218.1 |
| 7,123,387 B2 | 10/2006 | Cheng et al. | |
| 7,130,471 B2 | 10/2006 | Bossut et al. | |
| 7,145,699 B2 | 12/2006 | Dolan | |
| 7,168,614 B2 | 1/2007 | Kotovich et al. | |
| 7,173,732 B2 | 2/2007 | Matama | |
| 7,174,043 B2 | 2/2007 | Lossev et al. | |
| 7,177,049 B2 | 2/2007 | Karidi | |
| 7,181,082 B2 | 2/2007 | Feng | |
| 7,184,929 B2 | 2/2007 | Goodman | |
| 7,194,471 B1 | 3/2007 | Nagatsuka et al. | |
| 7,197,158 B2 | 3/2007 | Camara et al. | |
| 7,201,323 B2 | 4/2007 | Kotovich et al. | |
| 7,209,599 B2 | 4/2007 | Simske et al. | |
| 7,228,314 B2 | 6/2007 | Kawamoto et al. | |
| 7,249,717 B2 | 7/2007 | Kotovich et al. | |
| 7,251,777 B1 | 7/2007 | Valtchev et al. | |
| 7,253,836 B1 | 8/2007 | Suzuki et al. | |
| 7,263,221 B1 | 8/2007 | Moriwaki | |
| 7,266,768 B2 | 9/2007 | Ferlitsch et al. | |
| 7,317,828 B2 | 1/2008 | Suzuki et al. | |
| 7,337,389 B1 | 2/2008 | Woolf et al. | |
| 7,339,585 B2 | 3/2008 | Verstraelen et al. | |
| 7,340,376 B2 | 3/2008 | Goodman | |
| 7,349,888 B1 | 3/2008 | Heidenreich et al. | |
| 7,365,881 B2 | 4/2008 | Burns et al. | |
| 7,366,705 B2 | 4/2008 | Zeng et al. | |
| 7,382,921 B2 | 6/2008 | Lossev et al. | |
| 7,386,527 B2 | 6/2008 | Harris et al. | |
| 7,392,426 B2 | 6/2008 | Wolfe et al. | |
| 7,403,008 B2 | 7/2008 | Blank et al. | |
| 7,403,313 B2 | 7/2008 | Kuo | |
| 7,406,183 B2 | 7/2008 | Emerson et al. | |
| 7,409,092 B2 | 8/2008 | Srinivasa | |
| 7,409,633 B2 | 8/2008 | Lerner et al. | |
| 7,416,131 B2 | 8/2008 | Fortune et al. | |
| 7,426,293 B2 | 9/2008 | Chien et al. | |
| 7,430,059 B2 | 9/2008 | Rodrigues et al. | |
| 7,430,066 B2 | 9/2008 | Hsu et al. | |
| 7,430,310 B2 | 9/2008 | Kotovich et al. | |
| 7,447,377 B2 | 11/2008 | Takahira | |
| 7,464,066 B2 | 12/2008 | Zelinski et al. | |
| 7,478,332 B2 | 1/2009 | Buttner et al. | |
| 7,487,438 B1 | 2/2009 | Withers | |
| 7,492,478 B2 | 2/2009 | Une | |
| 7,492,943 B2 | 2/2009 | Li et al. | |
| 7,515,313 B2 | 4/2009 | Cheng | |
| 7,515,772 B2 | 4/2009 | Li et al. | |
| 7,528,883 B2 | 5/2009 | Hsu | |
| 7,545,529 B2 | 6/2009 | Borrey et al. | |
| 7,553,095 B2 | 6/2009 | Kimura | |
| 7,562,060 B2 | 7/2009 | Sindhwani et al. | |
| 7,580,557 B2 | 8/2009 | Zavadsky et al. | |
| 7,639,387 B2 | 12/2009 | Hull et al. | |
| 7,643,665 B2 | 1/2010 | Zavadsky et al. | |
| 7,651,286 B2 | 1/2010 | Tischler | |
| 7,655,685 B2 | 2/2010 | McElroy et al. | |
| 7,657,091 B2 | 2/2010 | Postnikov et al. | |
| 7,665,061 B2 | 2/2010 | Kothari et al. | |
| 7,673,799 B2 | 3/2010 | Hart et al. | |
| 7,738,730 B2 | 6/2010 | Hawley | |
| 7,739,127 B1 | 6/2010 | Hall | |
| 7,761,391 B2 | 7/2010 | Schmidtler et al. | |
| 7,778,457 B2 | 8/2010 | Nepomniachtchi et al. | |
| 7,787,695 B2 | 8/2010 | Nepomniachtchi et al. | |
| 7,937,345 B2 | 5/2011 | Schmidtler et al. | |
| 7,949,167 B2 | 5/2011 | Krishnan et al. | |
| 7,949,176 B2 | 5/2011 | Nepomniachtchi | |
| 7,949,660 B2 | 5/2011 | Green et al. | |
| 7,953,268 B2 | 5/2011 | Nepomniachtchi | |
| 7,958,067 B2 | 6/2011 | Schmidtler et al. | |
| 7,978,900 B2 | 7/2011 | Nepomniachtchi et al. | |
| 7,999,961 B2 | 8/2011 | Wanda | |
| 8,000,514 B2 | 8/2011 | Nepomniachtchi et al. | |
| 8,064,710 B2 | 11/2011 | Mizoguchi | |
| 8,073,263 B2 | 12/2011 | Hull et al. | |
| 8,078,958 B2 | 12/2011 | Cottrille et al. | |
| 8,094,976 B2 | 1/2012 | Berard et al. | |
| 8,135,656 B2 | 3/2012 | Evanitsky | |
| 8,194,965 B2 | 6/2012 | Lossev et al. | |
| 8,239,335 B2 | 8/2012 | Schmidtler et al. | |
| 8,244,031 B2 | 8/2012 | Cho et al. | |
| 8,265,422 B1 * | 9/2012 | Jin | H04N 5/3572 348/580 |
| 8,279,465 B2 | 10/2012 | Couchman | |
| 8,311,296 B2 | 11/2012 | Filatov et al. | |
| 8,326,015 B2 | 12/2012 | Nepomniachtchi | |
| 8,345,981 B2 | 1/2013 | Schmidtler et al. | |
| 8,354,981 B2 | 1/2013 | Kawasaki et al. | |
| 8,374,977 B2 | 2/2013 | Schmidtler et al. | |
| 8,379,914 B2 | 2/2013 | Nepomniachtchi et al. | |
| 8,385,647 B2 | 2/2013 | Hawley et al. | |
| 8,406,480 B2 | 3/2013 | Grigsby et al. | |
| 8,452,098 B2 | 5/2013 | Nepomniachtchi et al. | |
| 8,483,473 B2 | 7/2013 | Roach et al. | |
| 8,503,797 B2 | 8/2013 | Turkelson et al. | |
| 8,515,163 B2 | 8/2013 | Cho et al. | |
| 8,515,208 B2 | 8/2013 | Minerich | |
| 8,526,739 B2 | 9/2013 | Schmidtler et al. | |
| 8,532,419 B2 | 9/2013 | Coleman | |
| 8,559,766 B2 | 10/2013 | Tilt et al. | |
| 8,577,118 B2 | 11/2013 | Nepomniachtchi et al. | |
| 8,582,862 B2 | 11/2013 | Nepomniachtchi et al. | |
| 8,620,058 B2 | 12/2013 | Nepomniachtchi et al. | |
| 8,639,621 B1 | 1/2014 | Ellis et al. | |
| 8,677,249 B2 | 3/2014 | Buttner et al. | |
| 8,693,043 B2 | 4/2014 | Schmidtler et al. | |
| 8,705,836 B2 | 4/2014 | Gorski et al. | |
| 8,719,197 B2 | 5/2014 | Schmidtler et al. | |
| 8,749,839 B2 | 6/2014 | Borrey et al. | |
| 8,774,516 B2 | 7/2014 | Amtrup et al. | |
| 8,823,991 B2 | 9/2014 | Borrey et al. | |
| 8,855,375 B2 | 10/2014 | Macciola et al. | |
| 8,855,425 B2 | 10/2014 | Schmidtler et al. | |
| 8,885,229 B1 | 11/2014 | Amtrup et al. | |
| 9,137,417 B2 | 9/2015 | Macciola et al. | |
| 9,253,349 B2 | 2/2016 | Amtrup et al. | |
| 9,311,531 B2 | 4/2016 | Amtrup et al. | |
| 9,355,312 B2 | 5/2016 | Amtrup et al. | |
| 2001/0027420 A1 | 10/2001 | Boublik et al. | |
| 2002/0030831 A1 | 3/2002 | Kinjo | |
| 2002/0054693 A1 | 5/2002 | Elmenhurst | |
| 2002/0069218 A1 | 6/2002 | Sull et al. | |
| 2002/0122071 A1 | 9/2002 | Camara et al. | |
| 2002/0126313 A1 | 9/2002 | Namizuka | |
| 2002/0165717 A1 | 11/2002 | Solmer et al. | |
| 2003/0002068 A1 | 1/2003 | Constantin et al. | |
| 2003/0026479 A1 | 2/2003 | Thomas et al. | |
| 2003/0044012 A1 | 3/2003 | Eden | |
| 2003/0046445 A1 | 3/2003 | Witt et al. | |
| 2003/0101161 A1 | 5/2003 | Ferguson et al. | |
| 2003/0120653 A1 | 6/2003 | Brady et al. | |
| 2003/0142328 A1 | 7/2003 | McDaniel et al. | |
| 2003/0156201 A1 | 8/2003 | Zhang | |
| 2003/0210428 A1 | 11/2003 | Bevlin et al. | |
| 2003/0223615 A1 | 12/2003 | Keaton et al. | |
| 2004/0021909 A1 | 2/2004 | Kikuoka | |

(56) References Cited

U.S. PATENT DOCUMENTS

| | | |
|---|---|---|
| 2004/0022437 A1 | 2/2004 | Beardsley |
| 2004/0083119 A1 | 4/2004 | Schunder et al. |
| 2004/0090458 A1 | 5/2004 | Yu et al. |
| 2004/0093119 A1 | 5/2004 | Gunnarsson et al. |
| 2004/0102989 A1 | 5/2004 | Jang et al. |
| 2004/0111453 A1 | 6/2004 | Harris et al. |
| 2004/0143796 A1 | 7/2004 | Lerner et al. |
| 2004/0169873 A1 | 9/2004 | Nagarajan |
| 2004/0169889 A1 | 9/2004 | Sawada |
| 2004/0175033 A1 | 9/2004 | Matama |
| 2004/0181482 A1 | 9/2004 | Yap |
| 2004/0190019 A1 | 9/2004 | Li et al. |
| 2004/0261084 A1 | 12/2004 | Rosenbloom et al. |
| 2004/0263639 A1 | 12/2004 | Sadovsky et al. |
| 2005/0021360 A1 | 1/2005 | Miller et al. |
| 2005/0030602 A1 | 2/2005 | Gregson et al. |
| 2005/0046887 A1 | 3/2005 | Shibata et al. |
| 2005/0050060 A1 | 3/2005 | Damm et al. |
| 2005/0054342 A1 | 3/2005 | Otsuka |
| 2005/0060162 A1 | 3/2005 | Mohit et al. |
| 2005/0063585 A1 | 3/2005 | Matsuura |
| 2005/0065903 A1 | 3/2005 | Zhang et al. |
| 2005/0080844 A1 | 4/2005 | Dathathraya et al. |
| 2005/0100209 A1 | 5/2005 | Lewis et al. |
| 2005/0131780 A1 | 6/2005 | Princen |
| 2005/0134935 A1 | 6/2005 | Schmidtler et al. |
| 2005/0141777 A1 | 6/2005 | Kuwata |
| 2005/0151990 A1 | 7/2005 | Ishikawa et al. |
| 2005/0160065 A1 | 7/2005 | Seeman |
| 2005/0180628 A1 | 8/2005 | Curry et al. |
| 2005/0193325 A1 | 9/2005 | Epstein |
| 2005/0204058 A1 | 9/2005 | Philbrick et al. |
| 2005/0216426 A1 | 9/2005 | Weston et al. |
| 2005/0228591 A1 | 10/2005 | Hur et al. |
| 2005/0234955 A1 | 10/2005 | Zeng et al. |
| 2005/0246262 A1 | 11/2005 | Aggarwal et al. |
| 2005/0265618 A1 | 12/2005 | Jebara |
| 2005/0271265 A1 | 12/2005 | Wang et al. |
| 2006/0023271 A1 | 2/2006 | Boay et al. |
| 2006/0031344 A1 | 2/2006 | Mishima et al. |
| 2006/0047704 A1* | 3/2006 | Gopalakrishnan G06F 17/30247 |
| 2006/0048046 A1 | 3/2006 | Joshi et al. |
| 2006/0074821 A1 | 4/2006 | Cristianini |
| 2006/0089907 A1 | 4/2006 | Kohlmaier et al. |
| 2006/0093208 A1 | 5/2006 | Li et al. |
| 2006/0095373 A1 | 5/2006 | Venkatasubramanian et al. |
| 2006/0095374 A1 | 5/2006 | Lo et al. |
| 2006/0098899 A1 | 5/2006 | King et al. |
| 2006/0112340 A1 | 5/2006 | Mohr et al. |
| 2006/0114488 A1 | 6/2006 | Motamed |
| 2006/0115153 A1 | 6/2006 | Bhattacharjya |
| 2006/0120609 A1 | 6/2006 | Ivanov et al. |
| 2006/0159364 A1 | 7/2006 | Poon et al. |
| 2006/0161646 A1 | 7/2006 | Chene et al. |
| 2006/0164682 A1 | 7/2006 | Lev |
| 2006/0195491 A1 | 8/2006 | Nieland et al. |
| 2006/0206628 A1 | 9/2006 | Erez |
| 2006/0212413 A1 | 9/2006 | Rujan et al. |
| 2006/0215231 A1 | 9/2006 | Borrey et al. |
| 2006/0219773 A1 | 10/2006 | Richardson |
| 2006/0222239 A1 | 10/2006 | Bargeron et al. |
| 2006/0235732 A1 | 10/2006 | Miller et al. |
| 2006/0235812 A1 | 10/2006 | Rifkin et al. |
| 2006/0236304 A1 | 10/2006 | Luo et al. |
| 2006/0242180 A1 | 10/2006 | Graf et al. |
| 2006/0256392 A1 | 11/2006 | Van Hoof et al. |
| 2006/0257048 A1 | 11/2006 | Lin et al. |
| 2006/0263134 A1 | 11/2006 | Beppu |
| 2006/0265640 A1 | 11/2006 | Albornoz et al. |
| 2006/0268356 A1 | 11/2006 | Shih et al. |
| 2006/0268369 A1 | 11/2006 | Kuo |
| 2006/0279798 A1 | 12/2006 | Rudolph et al. |
| 2006/0282442 A1 | 12/2006 | Lennon et al. |
| 2006/0282463 A1 | 12/2006 | Rudolph et al. |
| 2006/0282762 A1 | 12/2006 | Diamond et al. |
| 2006/0288015 A1 | 12/2006 | Schirripa et al. |
| 2007/0002348 A1 | 1/2007 | Hagiwara |
| 2007/0002375 A1 | 1/2007 | Ng |
| 2007/0003155 A1 | 1/2007 | Miller et al. |
| 2007/0005341 A1 | 1/2007 | Burges et al. |
| 2007/0016848 A1 | 1/2007 | Rosenoff et al. |
| 2007/0030540 A1 | 2/2007 | Cheng et al. |
| 2007/0035780 A1 | 2/2007 | Kanno |
| 2007/0046957 A1 | 3/2007 | Jacobs et al. |
| 2007/0046982 A1 | 3/2007 | Hull et al. |
| 2007/0047782 A1 | 3/2007 | Hull et al. |
| 2007/0065033 A1 | 3/2007 | Hernandez et al. |
| 2007/0086667 A1 | 4/2007 | Dai et al. |
| 2007/0109590 A1 | 5/2007 | Hagiwara |
| 2007/0118794 A1 | 5/2007 | Hollander et al. |
| 2007/0128899 A1 | 6/2007 | Mayer |
| 2007/0133862 A1 | 6/2007 | Gold et al. |
| 2007/0165801 A1 | 7/2007 | Devolites et al. |
| 2007/0239642 A1 | 10/2007 | Sindhwani et al. |
| 2007/0250416 A1 | 10/2007 | Beach et al. |
| 2007/0252907 A1 | 11/2007 | Hsu |
| 2007/0260588 A1 | 11/2007 | Biazetti et al. |
| 2008/0004073 A1 | 1/2008 | John et al. |
| 2008/0005678 A1 | 1/2008 | Buttner et al. |
| 2008/0082352 A1 | 4/2008 | Schmidtler et al. |
| 2008/0086432 A1 | 4/2008 | Schmidtler et al. |
| 2008/0086433 A1 | 4/2008 | Schmidtler et al. |
| 2008/0095467 A1* | 4/2008 | Olszak G02B 21/002 382/284 |
| 2008/0097936 A1 | 4/2008 | Schmidtler et al. |
| 2008/0130992 A1 | 6/2008 | Fujii |
| 2008/0133388 A1 | 6/2008 | Alekseev et al. |
| 2008/0137971 A1 | 6/2008 | King et al. |
| 2008/0144881 A1 | 6/2008 | Fortune et al. |
| 2008/0147561 A1 | 6/2008 | Euchner et al. |
| 2008/0166025 A1 | 7/2008 | Thorne |
| 2008/0175476 A1 | 7/2008 | Ohk et al. |
| 2008/0177643 A1 | 7/2008 | Matthews et al. |
| 2008/0183576 A1 | 7/2008 | Kim et al. |
| 2008/0212115 A1 | 9/2008 | Konishi |
| 2008/0215489 A1 | 9/2008 | Lawson et al. |
| 2008/0219543 A1 | 9/2008 | Csulits et al. |
| 2008/0235766 A1 | 9/2008 | Wallos et al. |
| 2008/0253647 A1 | 10/2008 | Cho et al. |
| 2008/0294737 A1 | 11/2008 | Kim |
| 2009/0015687 A1 | 1/2009 | Shinkai et al. |
| 2009/0073266 A1 | 3/2009 | Abdellaziz Trimeche et al. |
| 2009/0089078 A1 | 4/2009 | Bursey |
| 2009/0175537 A1 | 7/2009 | Tribelhorn et al. |
| 2009/0214112 A1 | 8/2009 | Borrey et al. |
| 2009/0228499 A1 | 9/2009 | Schmidtler et al. |
| 2010/0007751 A1 | 1/2010 | Icho et al. |
| 2010/0060910 A1 | 3/2010 | Fechter |
| 2010/0060915 A1 | 3/2010 | Suzuki et al. |
| 2010/0169250 A1 | 7/2010 | Schmidtler et al. |
| 2010/0202698 A1 | 8/2010 | Schmidtler et al. |
| 2010/0202701 A1 | 8/2010 | Basri et al. |
| 2010/0214584 A1 | 8/2010 | Takahashi |
| 2010/0232706 A1 | 9/2010 | Forutanpour |
| 2010/0280859 A1 | 11/2010 | Frederick, II |
| 2011/0013039 A1 | 1/2011 | Aisaka et al. |
| 2011/0025842 A1 | 2/2011 | King et al. |
| 2011/0116716 A1 | 5/2011 | Kwon et al. |
| 2011/0145178 A1 | 6/2011 | Schmidtler et al. |
| 2011/0196870 A1 | 8/2011 | Schmidtler et al. |
| 2011/0200107 A1 | 8/2011 | Ryu |
| 2011/0246076 A1 | 10/2011 | Su et al. |
| 2011/0249905 A1 | 10/2011 | Singh et al. |
| 2011/0285873 A1 | 11/2011 | Showering |
| 2012/0019614 A1* | 1/2012 | Murray H04N 13/0007 348/36 |
| 2012/0105662 A1 | 5/2012 | Staudacher et al. |
| 2012/0114249 A1 | 5/2012 | Conwell |
| 2012/0116957 A1 | 5/2012 | Zanzot et al. |
| 2012/0162527 A1 | 6/2012 | Baker |
| 2012/0194692 A1 | 8/2012 | Mers et al. |
| 2012/0230606 A1 | 9/2012 | Sugiyama et al. |
| 2012/0272192 A1 | 10/2012 | Grossman et al. |

(56) References Cited

U.S. PATENT DOCUMENTS

| | | |
|---|---|---|
| 2012/0284122 A1 | 11/2012 | Brandis |
| 2012/0293607 A1* | 11/2012 | Bhogal .............. G06T 3/4038 348/36 |
| 2013/0022231 A1 | 1/2013 | Nepomniachtchi et al. |
| 2013/0060596 A1 | 3/2013 | Gu et al. |
| 2013/0073459 A1 | 3/2013 | Zacarias et al. |
| 2013/0088757 A1 | 4/2013 | Schmidtler et al. |
| 2013/0090969 A1 | 4/2013 | Rivere |
| 2013/0117175 A1 | 5/2013 | Hanson |
| 2013/0121610 A1 | 5/2013 | Chen et al. |
| 2013/0124414 A1 | 5/2013 | Roach et al. |
| 2013/0152176 A1 | 6/2013 | Courtney et al. |
| 2013/0182002 A1 | 7/2013 | Macciola et al. |
| 2013/0182128 A1 | 7/2013 | Amtrup et al. |
| 2013/0182292 A1 | 7/2013 | Thrasher et al. |
| 2013/0182951 A1 | 7/2013 | Shustorovich et al. |
| 2013/0182959 A1 | 7/2013 | Thrasher et al. |
| 2013/0182970 A1 | 7/2013 | Shustorovich et al. |
| 2013/0182973 A1 | 7/2013 | Macciola et al. |
| 2013/0185618 A1 | 7/2013 | Macciola et al. |
| 2013/0230246 A1 | 9/2013 | Nuggehalli |
| 2013/0268378 A1 | 10/2013 | Yovin |
| 2013/0268430 A1 | 10/2013 | Lopez et al. |
| 2013/0287265 A1 | 10/2013 | Nepomniachtchi et al. |
| 2013/0287284 A1 | 10/2013 | Nepomniachtchi et al. |
| 2013/0297353 A1 | 11/2013 | Strange et al. |
| 2013/0308832 A1 | 11/2013 | Schmidtler et al. |
| 2014/0006129 A1 | 1/2014 | Heath |
| 2014/0006198 A1 | 1/2014 | Daly et al. |
| 2014/0012754 A1 | 1/2014 | Hanson et al. |
| 2014/0055826 A1* | 2/2014 | Hinski .............. H04N 1/3876 358/473 |
| 2014/0079294 A1 | 3/2014 | Amtrup et al. |
| 2014/0108456 A1 | 4/2014 | Ramachandrula et al. |
| 2014/0153787 A1 | 6/2014 | Schmidtler et al. |
| 2014/0153830 A1 | 6/2014 | Amtrup et al. |
| 2014/0164914 A1 | 6/2014 | Schmidtler et al. |
| 2014/0201612 A1 | 7/2014 | Buttner et al. |
| 2014/0207717 A1 | 7/2014 | Schmidtler et al. |
| 2014/0233068 A1 | 8/2014 | Borrey et al. |
| 2014/0254887 A1 | 9/2014 | Amtrup et al. |
| 2014/0270349 A1 | 9/2014 | Amtrup et al. |
| 2014/0270536 A1 | 9/2014 | Amtrup et al. |
| 2014/0327940 A1 | 11/2014 | Amtrup et al. |
| 2014/0333971 A1 | 11/2014 | Macciola et al. |
| 2014/0368890 A1 | 12/2014 | Amtrup et al. |
| 2015/0339526 A1 | 11/2015 | Macciola et al. |

FOREIGN PATENT DOCUMENTS

| | | |
|---|---|---|
| EP | 0767578 A2 | 4/1997 |
| EP | 0843277 A2 | 5/1998 |
| EP | 0936804 A2 | 8/1999 |
| EP | 1128659 A1 | 8/2001 |
| EP | 1317133 A1 | 6/2003 |
| EP | 1422920 A2 | 5/2004 |
| EP | 1956518 A1 | 8/2008 |
| EP | 1959363 A2 | 8/2008 |
| EP | 1976259 A1 | 10/2008 |
| JP | H0962826 A | 3/1997 |
| JP | H09116720 A | 5/1997 |
| JP | 2000067065 A | 3/2000 |
| JP | 2000103628 A | 4/2000 |
| JP | 2000354144 A | 12/2000 |
| JP | 2001309128 A | 11/2001 |
| JP | 2002024258 A | 1/2002 |
| JP | 2002519766 A | 7/2002 |
| JP | 2002312385 A | 10/2002 |
| JP | 2003091521 A | 3/2003 |
| JP | 2003196357 A | 7/2003 |
| JP | 2003234888 A | 8/2003 |
| JP | 2003303315 A | 10/2003 |
| JP | 2005018678 A | 1/2005 |
| JP | 2005173730 A | 6/2005 |
| JP | 2006209588 A | 8/2006 |
| JP | 2008134683 A | 6/2008 |
| TW | 401553 B | 8/2000 |
| WO | 9604749 A1 | 2/1996 |
| WO | 9847098 A1 | 10/1998 |
| WO | 9967731 A1 | 12/1999 |
| WO | 02063812 A2 | 8/2002 |
| WO | 2004053630 A2 | 6/2004 |
| WO | 2006104627 A1 | 10/2006 |
| WO | 2008008142 A2 | 1/2008 |
| WO | 2010030056 A1 | 3/2010 |
| WO | 2010056368 A1 | 5/2010 |

OTHER PUBLICATIONS

U.S. Appl. No. 61/780,747, filed Mar. 13, 2013.
U.S. Appl. No. 61/819,463, dated May 3, 2013.
Notice of Allowance from U.S. Appl. No. 14/268,876, dated Aug. 29, 2014.
Non-Final Office Action from U.S. Appl. No. 14/268,876, dated Jul. 24, 2014.
Non-Final Office Action from U.S. Appl. No. 14/473,950, dated Jan. 21, 2015.
Non-Final Office Action from U.S. Appl. No. 14/473,950, dated Feb. 6, 2015.
Final Office Action from U.S. Appl. No. 14/473,950, dated Jun. 26, 2015.
Notice of Allowance from U.S. Appl. No. 14/473,950, dated Sep. 16, 2015.
Extended European Search Report from European Application No. 14861942.2, dated Nov. 2, 2016.
Non-Final Office Action from U.S. Appl. No. 15/191,442, dated Oct. 12, 2016.
Partial Supplementary European Search Report from European Application No. 14792188.6, dated Sep. 12, 2016.

* cited by examiner

SYSTEMS AND METHODS FOR IMPROVING VIDEO CAPTURED USING MOBILE DEVICES

PRIORITY CLAIM

This application is a continuation of U.S. patent application Ser. No. 14/473,950, filed Aug. 29, 2014, which is a continuation of U.S. patent application Ser. No. 14/268,876, filed May 2, 2014, now U.S. Pat. No. 8,885,229, which claims priority to U.S. Provisional Patent Application No. 61/819,463, filed May 3, 2013, each of which are herein incorporated by reference.

RELATED APPLICATIONS

This application is related to U.S. Pat. No. 6,370,277, granted Apr. 9, 2002 (U.S. patent application Ser. No. 09/206,753, filed Dec. 7, 1998) as well as copending U.S. patent application Ser. No. 13/740,123, filed Jan. 11, 2013; Ser. No. 13/802,226, filed Mar. 13, 2013; Ser. No. 14/209,825, filed Mar. 13, 2014; Ser. No. 14/259,866, filed Apr. 23, 2014; Ser. No. 14/177,136, filed Feb. 10, 2014; Ser. No. 14/175,999, filed Feb. 7, 2014; Ser. No. 14/220,016, filed Mar. 19, 2014; Ser. No. 14/220,023, filed Mar. 19, 2014 and Ser. No. 14/220,029, filed Mar. 19, 2014; and Provisional U.S. Patent Application No. 61/883,865, filed Sep. 27, 2013, and 61/905,063, filed Nov. 15, 2013, each of which are herein incorporated by reference.

FIELD OF INVENTION

The present invention relates to digital video capture and digital video data processing, and more particularly to capturing and processing digital video data using a mobile device.

BACKGROUND OF THE INVENTION

Modern mobile devices are well adapted to capturing images of a variety of objects, including documents, persons, automobiles, etc. Improvements to the mobile device camera capabilities and/or processing power make applications for capturing and/or processing digital image data using a mobile device increasingly attractive in an increasingly mobile-device-driven economy.

However, limitations of the mobile device hardware and practical limitations of capturing images using a mobile device present major challenges to efficient and effective digital image processing. For example, digital images captured using a mobile device are often of insufficient quality for subsequent processing due to one or more artifacts such as blur, uneven illumination, insufficient illumination, oversaturated illumination, insufficient resolution, projective effects, etc. Attempts to process digital images including such artifacts may fail completely or produce inadequate quality results for the desired application. At best, the user may be required to repeat the capture operation and attempt to improve the quality of the image, but in some cases recapturing the image may be impossible, resulting in lost opportunity for acquiring images of important but transient circumstances, such as the location or condition of a person or vehicle before, during, and/or after an automobile accident.

Accordingly, it would be beneficial to provide systems, methods, and/or computer program products capable of capturing and/or processing data other than still digital images in a manner that overcomes the challenges presented above and improve users' ability to capture and process data, especially using mobile devices.

SUMMARY OF THE INVENTION

In one embodiment, a method includes: invoking an image capture interface via a mobile device, the capture interface comprising a viewfinder represented on a display of the mobile device; analyzing a plurality of frames of video data captured via the capture interface, wherein the analyzing comprises determining: whether an object exhibiting one or more defining characteristics is depicted within the viewfinder; and whether the object depicted within the viewfinder satisfies one or more predetermined quality control criteria; and in response to determining a frame fails one or more of the predetermined quality control criteria, displaying an indication of the failure on the mobile device display; and in response to determining the object depicted within the viewfinder satisfies the one or more predetermined quality control criteria, one or more of: displaying an indication that the object depicted in the viewfinder exhibits the one or more defining characteristics; automatically capturing an image of the object, wherein the image is characterized by a resolution higher than a resolution of the video data; and automatically storing to a memory one or more of the frames in which the object satisfying the predetermined quality control criteria is depicted in the viewfinder.

In another embodiment, a system includes: a processor; and logic in and/or executable by the processor to cause the processor to: invoke an image capture interface via a mobile device, the capture interface comprising a viewfinder represented on a display of the mobile device; analyze a plurality of frames of video data captured via the capture interface, wherein the analysis comprises: determining whether an object exhibiting one or more defining characteristics is depicted within the viewfinder; and determining whether the object depicted within the viewfinder satisfies one or more predetermined quality control criteria; and in response to determining a frame fails one or more of the predetermined quality control criteria, display an indication of the failure on the mobile device display; and in response to determining the object depicted within the viewfinder satisfies the one or more predetermined quality control criteria, one or more of: display an indication that the object depicted in the viewfinder exhibits the one or more defining characteristics; automatically capture an image of the object, wherein the image is characterized by a resolution higher than a resolution of the video data; and automatically store to a memory one or more of the frames in which the object satisfying the predetermined quality control criteria is depicted in the viewfinder.

In still another embodiment, a computer program product includes: a computer readable storage medium having program code embodied therewith, the program code readable/executable by a processor to cause the processor to: invoke an image capture interface via a mobile device, the capture interface comprising a viewfinder represented on a display of the mobile device; analyze a plurality of frames of video data captured via the capture interface, wherein the analysis comprises: determining whether an object exhibiting one or more defining characteristics is depicted within the viewfinder; and determining whether the object depicted within the viewfinder satisfies one or more predetermined quality control criteria; and in response to determining a frame fails one or more of the predetermined quality control criteria, display an indication of the failure on the mobile device display; and, in response to determining the object depicted within the viewfinder satisfies the one or more predetermined quality control criteria, one or more of: display an indication that the object depicted in the viewfinder exhibits the one or more defining characteristics; automatically capture an image of the object, wherein the image is characterized by a resolution higher than a resolution of the video data; and automatically store to a memory one or more of the frames in which the object satisfying the predetermined quality control criteria is depicted in the viewfinder.

DETAILED DESCRIPTION

Figure 1:
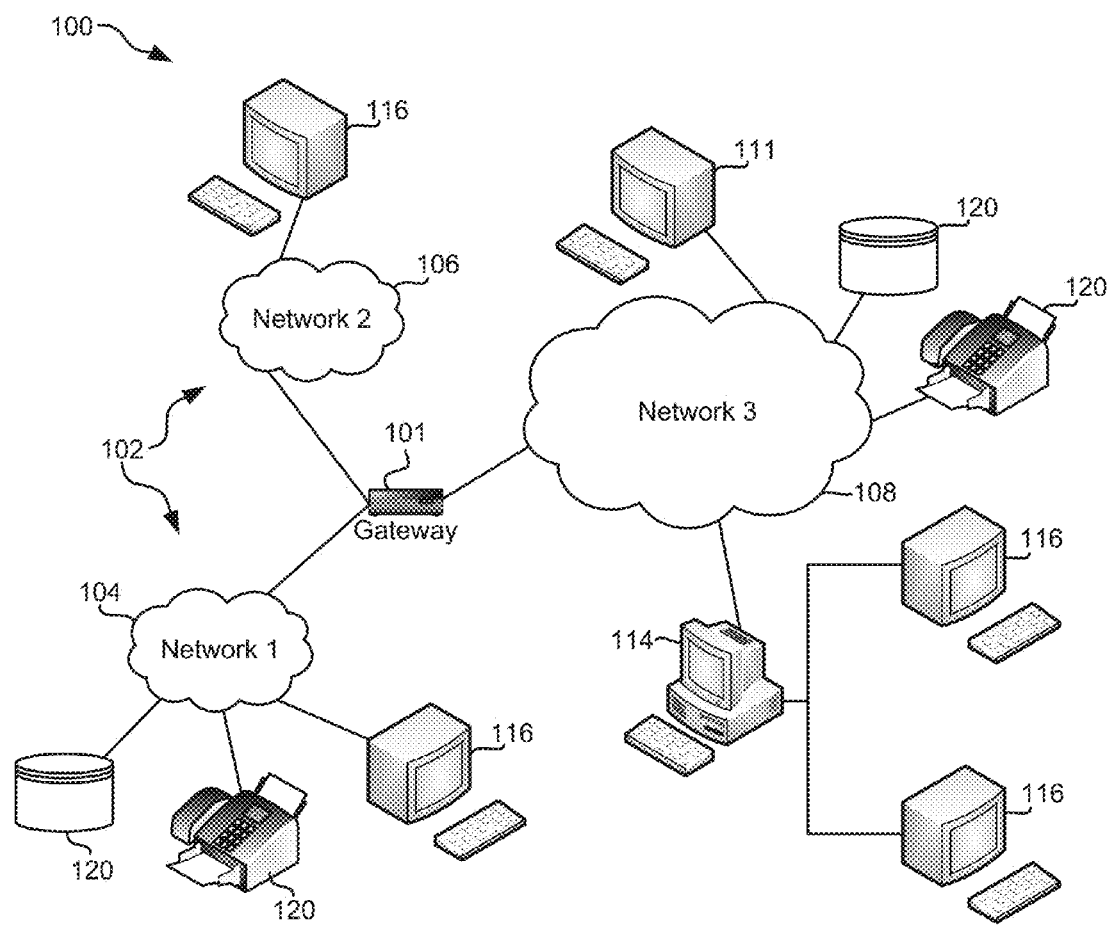
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The present application refers to image processing. In particular, the present application discloses systems, methods, and computer program products designed to augment current still-photo based methods and systems for capturing a digital image to leverage streaming video data to capture and process various types of information. As digital imaging technology continues to improve, video stream resolution usually lags available photo resolutions. As such, leveraging video streaming for document capture has been previously limited to smaller size objects because the available resolution did not always provide sufficient detail regarding larger objects to effectively process digital images depicting such objects. As video stream resolutions increase, this limitation has decreasingly impacted processing capabilities and suitability such that processing data from a video stream has become a viable alternative or even a preferred replacement to still-photo capture in various applications and/or implementations.

At a high level, an exemplary user experience for video stream capture may be loosely based on the following scenario.

A user invokes a video-stream capture interface from a native mobile application, via a software development kit (SDK) used to develop or modify anew or existing mobile application, via a built-in mobile operating system (OS) functionality, etc. Once invoked, the user is presented with an option to select video-based capture and perform a video-based capture operation. The capture application exposes a video capture interface that guides the user to ensure the physical object remains within the bounds of a bounding box superimposed on the mobile capture user interface. Once within the bounding box, the user clicks on the 'Capture' button to initiate the capture process. Once initiated, a mobile interface begins checking for stability of the mobile device using one or more hardware components of the mobile device such as an accelerometer, gyroscope, etc. Once stability has been achieved, an autofocus operation may be forced and the process of analyzing each of the (n) frames of the video stream begins.

The goal of frame analysis is to detect the existence of a target object within the vantage point provided by the video stream. Entities include but are not limited to page(s), barcode(s), buildings, motor vehicles, boats, persons, etc. The actual implementation of the real-time methodology and algorithms used to detect the existence of the target entity within the video frame will be discussed separately from this document.

Once the existence of the target object has been detected in one or more frames of the stream, either the frame is identified and processed by image perfection techniques, such as embodied in one exemplary scenario via electronic virtual rescan (EVRS) or for devices that support the necessary capability, the full resolution (photo) corresponding to the target video frame is identified and processed by EVRS. Alternatively, multiple low-resolution video frames could be combined to a single higher-resolution image.

From there, the mobile application may facilitate providing as much relevant entity metadata as possible with the lowest possible latency. Relevant metadata could include but not be limited to object type, object characteristics, field metadata. GPS information, page size, barcode value(s), car type, person height, boat length, etc.).

This capability would allow the user to capture multiple objects and object types simultaneously. Moreover, objects may be associated with a particular downstream process (e.g. a business process such as a loan application, insurance claim, financial transaction, etc.) quickly and easily with minimal user input other than simple click, point and capture functionality.

From one perspective, the overall capture and processing may generally follow a logical order similar to the flow diagram shown below.

It will be appreciated upon reading the present descriptions that the overall flow diagram shown below is a coarse conceptual example that should not be considered limiting in any way. The presently described capture and processing may, in various embodiments, include any number of additional and/or different operations, perform such operations in a different order, and/or omit certain operations depicted in the flow diagram.

Images (e.g. pictures, figures, graphical schematics, single frames of movies, videos, films, clips, etc.) are preferably digital images captured by cameras, especially cameras of mobile devices. As understood herein, a mobile device is any device capable of receiving data without having power supplied via a physical connection (e.g. wire, cord, cable, etc.) and capable of receiving data without a physical data connection e.g. wire, cord, cable, etc.). Mobile devices within the scope of the present disclosures include exemplary devices such as a mobile telephone, smartphone, tablet, personal digital assistant, iPod®, iPad®, BLACKBERRY® device, etc.

However, as it will become apparent from the descriptions of various functionalities, the presently disclosed mobile image processing algorithms can be applied, sometimes with certain modifications, to images coining from scanners and multifunction peripherals (MFPs). Similarly, images processed using the presently disclosed processing algorithms may be further processed using conventional scanner processing algorithms, in some approaches.

Of course, the various embodiments set forth herein may be implemented utilizing hardware, software, or any desired combination thereof. For that matter, any type of logic may be utilized which is capable of implementing the various functionality set forth herein.

One benefit of using a mobile device is that with a data plan, image processing and information processing based on captured images can be done in a much more convenient, streamlined and integrated way than previous methods that relied on presence of a scanner. However, the use of mobile devices as document(s) capture and/or processing devices has heretofore been considered unfeasible for a variety of reasons.

In one approach, an image may be captured by a camera of a mobile device. The term "camera" should be broadly interpreted to include any type of device capable of capturing an image of a physical object external to the device, such as a piece of paper. The term "camera" does not encompass a peripheral scanner or multifunction device. Any type of camera may be used. Preferred embodiments may use cameras having a higher resolution, e.g. 8 MP or more, ideally 12 MP or more. The image may be captured in color, grayscale, black and white, or with any other known optical effect. The term "image" as referred to herein is meant to encompass any type of data corresponding to the output of the camera, including raw data, processed data, etc.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 1.08, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or mutation may be enhanced through the use of VMWARE software, in some embodiments.

In more approaches, one or more networks 104, 106, 108, may represent a cluster of systems commonly referred to as a "cloud," In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 2:
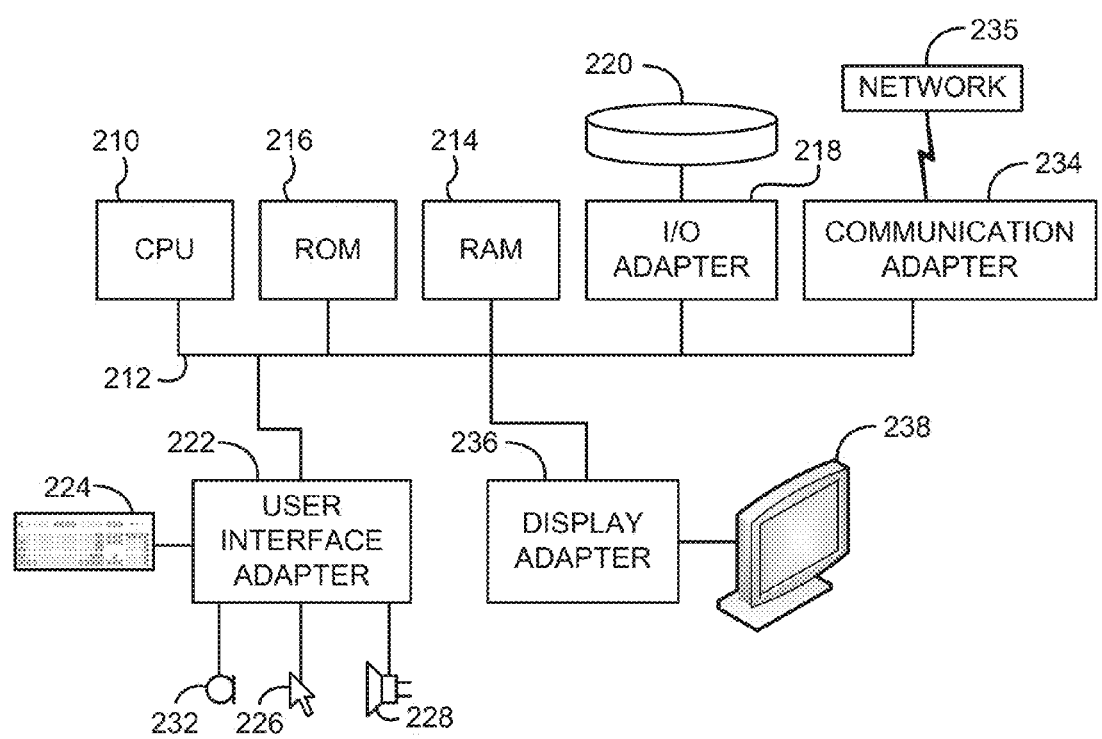
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

An application may be installed on the mobile device, e.g., stored in a nonvolatile memory of the device. In one approach, the application includes instructions to perform processing of an image on the mobile device. In another approach, the application includes instructions to send the image to a remote server such as a network server. In yet another approach, the application may include instructions to decide whether to perform some or all processing on the mobile device and/or send the image to the remote site.

In various embodiments, the presently disclosed methods, systems and/or computer program products may utilize and/or include any of the functionalities disclosed in related U.S. patent application Ser. No. 13/740,123, filed Jan. 11, 2013. For example, digital images suitable for processing in whole or in part using the presently disclosed methodologies, systems, etc. may be subjected to any image processing operations disclosed in the aforementioned Patent Application, such as page detection, rectangularization, detection of uneven illumination, illumination normalization, resolution estimation, blur detection, etc.

In various embodiments, the presently disclosed methods, systems and/or computer program products may utilize and/or include any of the functionalities disclosed in related U.S. patent application Ser. No. 13/802,226, filed Mar. 13, 2013 and Provisional U.S. Patent Application No. 61/780, 747, filed Mar. 13, 2013. For example, digital images suitable for processing in whole or in part using the presently disclosed methodologies, systems, etc. may be subjected to any classification and/or data extraction operations disclosed in the aforementioned Patent Applications, including for instance classifying objects depicted in a digital image according to type based at least in part on characteristics of the object, performing custom-tailored image processing using information about the object characteristics and/or object class, building and/or using feature vectors to perform classification, building and/or using feature vectors to develop a data extraction model for the object and/or object class(es), using data extraction models to extract data from digital images, etc.

In some embodiments, and entirely separate from the "extraction" operations and techniques disclosed herein, it may be useful to perform the image capture, analysis and processing as described, and subsequently analyze the resulting image with a targeted optical character recognition (OCR) operation. For example, a user may define a portion of a processed image upon which to perform the OCR, and may hover a window over that portion of the processed image. Then, the user may receive OCR results either pursuant to a request submitted by the user e.g. to OCR the windowed region of the image) or automatically in near- or real-time in response to the window position e.g. a constantly-active OCR process is performed on the image portion(s) falling within the OCR window, and any recognized characters may be displayed in real-time on the mobile device.

Preferably, the windowed OCR approach may be utilized to determine, verify (e.g. confirm an observed value obtained via OCR by comparing to a reference value), and/or validate (e.g. as mentioned above and further described in related U.S. Pat. No. 8,345,981 and/or U.S. patent application Ser. No. 14/175,999 (filed Feb. 7, 2014); Ser. No. 14/176,606 (filed Feb. 7, 2014) and/or Ser. No. 14/078,402 (filed Nov. 12, 2013)) text characters depicted in the depicted object. Even more preferably, the windowed OCR approach may be utilized to specifically determine "identifying information," e.g. as defined and described in related U.S. patent application Ser. No. 14/220,016 (filed Mar. 19, 2014).

For example, in one approach classification may include determining whether a depicted object belongs to one or more predetermined classes, and if not, requesting user input defining a new class. This approach may be augmented in some embodiments by automatically determining defining characteristics for the new class based on the user input, the object depicted in the image(s), a combination thereof, and/or any other relevant descriptive information as would be appreciated by skilled artisans. In this manner, it is possible for the present systems to be extended to unknown object types based on minimal input from the user and defining characteristics determined based on user input, image data, and/or a combination thereof.

In more approaches, the presently disclosed methods, systems, and/or computer program products may be utilized with, implemented in, and/or include one or more user interfaces configured to facilitate performing any functionality disclosed herein and/or in the aforementioned related Patent Application, such as an image processing mobile application, a case management application, and/or a classification application, in multiple embodiments.

In still more approaches, the presently disclosed systems, methods and/or computer program products may be advantageously applied to one or more of the use methodologies and/or scenarios disclosed in the aforementioned related Patent Application, among others that would be appreciated by one having ordinary skill in the art upon reading these descriptions.

It will further be appreciated that embodiments presented herein may be provided in the form of a service deployed on behalf of a customer to offer service on demand.

Video Capture and Discovery

In some embodiments, via a mobile application a user may capture video, analyze video and then store a full still photo resolution frame or frames. To facilitate computational efficiency, it is possible to use video data with a lower resolution than the full still photo resolution frame(s) for discovering objects depicted in the frame(s). Upon discovering a target object, various embodiments may use one or more high resolution photo frame for further processing.

For example, low-resolution video capture and processing of small documents like drivers licenses or business cards or checks is possible at least in part because some embodiments of capture may zoom in so close that even the low resolution video feed produces sufficient resolution for discovering the small document in the object.

In one approach, a capture component of a mobile application within the scope of the present disclosure may facilitate a user invoking a mobile device camera in a video capture mode. The user may provide input instructing the capture component to initiate capturing video data. The application, in response to receiving the "begin capture" instruction, in response to displaying a prompt to the user instructing the user to prepare for capturing data, etc. may query an on-device hardware such as an accelerometer and/or gyroscope for stability information. Upon detecting conditions from the on-device hardware that correspond to a stability condition, the application may force an autofocus, capture frames, and then spawn a background process to invoke and/or conduct image processing.

Moreover, the captured frames may be characterized by a resolution higher than a resolution of the video stream (and corresponding data) displayed to the user while performing the stability determination, focus, object discovery, etc. In some embodiments, a user reviewing a video stream may be simultaneously presented with a corresponding high-resolution frame of image data to review and/or provide feedback and user input relating to capture and/or processing using the mobile device/application.

In more embodiments, the capture component may be further improved to classify objects by type and selectively invoke the capture operation. For example, capture may be invoked only upon determining the capture field encompasses an object of interest, such as a document, an animal, a vehicle, a person, a particular type of document, animal, vehicle, etc.

In still more embodiments, the capture component may be further improved to determine classification of objects and/or detect characteristics of objects, and selectively invoke the capture operation in response to detecting an expected type of characteristic in the object. For example, a video stream of a capture field encompassing a document may be utilized to classify the type of document, and based on the document classification, the video stream may be utilized to determine whether the document contains particular characteristics, such as particular content (e.g. particular text such as a name, address, account number, a particular symbol such as a barcode, logo, a photograph, etc. as would be understood by one having ordinary skill in the art upon reading the present descriptions).

By providing additional classification capability in this vein, the mobile application may avoid undesirably capturing video data upon receiving information indicative of a stability condition, but where the capture field is focused on an object of no interest for subsequent processing (e.g. the mobile application would be capable of selectively avoiding capturing video of a dog as part of an overall document-processing workflow). Preferably, the classifying operation comprises a high-speed initial analysis to detect the existence of the object of interest in the video frame. However, classification may include any functionality discussed in related U.S. patent application Ser. No. 13/802,226.

In various approaches, upon determining a stability exists, achieving focus, and determining the capture field encompasses a desired capture target, the mobile application may invoke one or more processing operations. As input to the processing operations, the mobile application may provide either the video stream, frames from the video stream, and/or high resolution equivalents thereof.

Additional embodiments may include providing functionality to determine a minimum resolution necessary to perform object discovery, image processing, or any of a variety of downstream processing operations so that a mobile application may facilitate a user capturing the requisite data for subsequent processing in the most computationally efficient manner possible. For example, a user may invoke a training component of the mobile application, and directed to capture video data corresponding to a particular object or object type; the user may be directed to perform the capture operation for a plurality of repetitions, and with or without the user's knowledge, each repetition may capture video data at a different resolution so as to provide a diverse array of video data representing the object in a range of resolutions.

The mobile application may transparently perform object discovery, image processing, etc. using one or more of the plurality of different-resolution video data samples. Some of the samples may produce acceptable results, while others may not. The application may utilize information regarding the results achieved using various input samples to determine a resolution for subsequent use when capturing and/or performing various processing operations for objects corresponding to the particular object or object type for which training was performed.

In one approach, a resolution sufficient for object discovery is any resolution that enables detection of contrast between the foreground of the image, e.g. regions of the image corresponding to the object, and the background of the image, e.g. regions of the image not corresponding to the object. Detecting contrast includes detecting the existence of a subregion of the image containing a potential or "candidate" object boundary. For certain objects, a resolution in a range from about 25 dots per inch (DPI) to about 50 DPI may be sufficient to detect contrast and therefore object boundaries. Initial processing such as object discovery may be performed using these relatively low-resolution images to process data in a highly efficient manner. Additional processing may be performed utilizing the low-resolution image or a corresponding high-resolution image according to the requirements and/or desired result of the process.

In some approaches, upon detecting an object from the video stream data, a corresponding high resolution image may be captured and cropped to remove some or all background from the image.

In further embodiments, user feedback may be requested, obtained, and/or used to facilitate capturing and/or processing of video data as described herein. For example, upon performing object discovery on video data, various frames of the video data in which an object was reportedly discovered may be presented to the user. The user may confirm, modify or negate the discovery result determination. Based on the user input, the discovery algorithm may be modified.

In another example, based on the user input a minimum capture resolution may be determined, where the various frames correspond to different capture resolutions, as discussed above in regard to training the capture component.

Super-Resolution

In further approaches, it may be advantageous to utilize data from multiple frames of image and/or video data to generate a single, superior composite image for processing. For example, a higher resolution image may be composed from multiple relatively low-resolution frames of video data. Alternatively, multiple high-resolution images may be synthesized into an even higher-resolution image. Further still, a relatively low-resolution region of an otherwise high-resolution image, or a blurred region (for example as may be caused by unstable capture conditions) of an otherwise clear image may be improved by synthesizing data from multiple image and/or video frames to resample the low-resolution or blurred region and generate a high-quality (i.e. high resolution/clarity) composite image. In some embodiments, the frames may represent binary image data (i.e. corresponding to two-tone or "bitonal" images), which may be compared, merged, and/or utilized to extract data from the image, such as text characters on a document.

Metadata

Retrieving, receiving, and providing metadata, as well as associating metadata with digital image data is another advantageous functionality within the scope of the presently described mobile application. Preferably, the mobile application facilitates obtaining and associating all available metadata with the corresponding image data. For example, in one scenario a user captures a video stream and/or image data corresponding to a document. The document may be detected within the image data and classified as a particular document type. Based on the classification, metadata may be retrieved from a knowledge base comprising a plurality of document classes and associated metadata. The retrieved metadata may then be associated with the document image data and/or video data in any suitable manner.

Metadata may include any information that is relevant to an object, an image of an object, etc. With continuing reference to the exemplary scenario involving a document as the object, illustrative metadata may include the document type, text content in the document, context of the text (e.g. positional location, font type, color, size, etc.) page size, page resolution, color bit depth, etc. In other embodiments, the metadata may correspond to instructions for subsequent processing of the data, such as particular parameters for manipulating image size, color profile, etc., particular parameters for extracting data from the image, etc. as would be understood by one having ordinary skill in the art upon reading the present descriptions.

Image Authentication

In some embodiments, various types of data, including raw and/or processed image data, metadata associated with image data, etc. as would be understood by one having ordinary skill in the art reading the present descriptions can include and/or be associated with authentication data. Authentication data may be utilized to very quickly and efficiently determine a status of data, such as whether a particular file has been altered from a previous state (e.g. by adding or removing metadata to an image file, by editing metadata associated with an image file, by processing or re-processing image data with different parameters, etc.).

In one embodiment, image authentication may include creating one or more authentication strings from a buffer in memory. The string may be any length, but is preferably a 127-byte string in at least some approaches. More particularly, authentication may involve compressing an image (which may include image data and/or associated metadata) to a memory buffer and creating the authentication string or strings for/from one or more portions of the buffer. Creating the authentication string(s) may include encoding data in the portions of the buffer into the authentication string, in one embodiment. Any form of encoding may be employed.

For example, authentication may generate an authentication string for only the image, for only the metadata, for the image and the associated metadata, etc. The authentication strings may be inserted into, appended to, or associated with the buffer in various approaches, and are preferably added to the buffer as one or more tags, at which point the buffer is dumped to physical memory (e.g. to disk) as a file. Notably, these authentication approaches may be equally applied to any format of image and/or metadata, including any compression format allowing metadata tags, such as JPEG or TIFF formats.

Additionally and/or alternatively, the authentication string may be embedded into the image itself, for example using a steganographic approach.

Data having authentication strings as described above can be subsequently authenticated to determine whether the data has been altered since the authentication strings were created. In particular, the file having the authentication tags may be read from physical memory into a memory buffer, and the encoded authentication strings may be extracted from the corresponding tags. These strings may be decoded and compared to the corresponding portion(s) of the buffer from which the encoded authentication string was generated. If the decoded authentication string and the portion of the buffer used to generate the authentication string match, the portion of the buffer used to generate the authentication string has not been altered, indicating that the entire file is unlikely to have been altered either. By utilizing multiple authentication strings (multiple portions of the buffer), determining whether a file has been altered may be performed with higher confidence, albeit at the cost of computational efficiency.

In one exemplary approach, video capture and processing may be performed in a manner substantially similar to the flow diagram shown below. As noted with regard to other flow diagrams presented above, this illustrative example is in no way limiting, but rather provided to facilitate better understanding of the inventive concepts presented herein.

Video Capture User Interface

In still more embodiments, the presently described systems, methods, and computer program products may be implemented via one or more user interfaces configured to facilitate capturing and processing information using video data.

The user interfaces may further enable a user to easily perform capture and processing operations using video data, as well as review the results of such capture and/or processing operations in real-time or near real-time. For example, each time that image and/or video data is captured and/or processed, a thumbnail corresponding to the image and/or video data may be produced and presented to a user. Generating the thumbnail may be a process that is performed asynchronously in the background, in some approaches. Via the thumbnail, a user may review the results of what was captured and/or processed. If the user is dissatisfied with the result, or the result is otherwise determined to be unacceptable, e.g. according to one or more predefined quality assurance metrics, a user interface may facilitate re-capturing and/or augmenting the originally captured data.

In addition, user interfaces may be provided to enable and/or facilitate user review of capture and/or processing results, for example at the end of a capture-and-process session. For instance, in one approach a user, upon completion of a capture and/or processing workflow (e.g. video and/or image data have been captured and at least one processing operation performed on the data), the user may be presented with an opportunity to review the result of the workflow.

In another approach, user review may be enabled during the video capture operation. For example, a user initiates the video capture functionality of a mobile application, and begins capturing video data. As described above, the capture operation includes preprocessing such as stability determination and/or object discovery. In the course of capturing the video data, an object in the capture field is detected and an indication of the discovery is presented to the user (for example the appearance of a bounding box within the capture field changing color from red to green). A high-resolution image, thumbnail, etc. is optionally captured upon discovering the object and determining the existence of a stability condition, and the image may be presented to the user for immediate review within the video capture user interface. Upon reviewing the image, thumbnail, etc., the user may indicate the acceptability of the captured image, generated thumbnail, etc. If the user indicates the image, thumbnail, etc. is acceptable, then the video capture user interface may automatically terminate the capture operation, or optionally may direct the user to terminate the capture operation. In this manner, user review may be utilized to minimize the occurrence of unnecessary capture and/or processing operations, such as may be caused by a user continuing to perform a capture operation after a suitable high-resolution image has been captured and/or processed in a manner that satisfies requirements for downstream processing, such as image quality, image format, etc.

Tracking

In various approaches, the presently disclosed techniques benefit from the advantage of real-time (or near-real time) latency. In other words, as a user interacting with a mobile device conducts a capture operation, an analysis, etc. as disclosed herein, the underlying processes conducted to accomplish each operation may be performed in parallel, i.e. for multiple objects simultaneously, and in a near-real time manner. The computational cost has been reduced to an extent necessary to provide real-time information regarding object(s) depicted in a mobile device viewfinder, and represents a major advantage to the user when compared to existing techniques that require discrete capture, analysis, and submission techniques.

As a result, one of the advantageous embodiments of real-time capture, processing, analysis, and etc. is the ability to "track" objects throughout the course of performing the presently disclosed techniques. By "tracking" it should be understood that an object within a mobile device field of view may be identified and/or analyzed, and the identification/analysis may remain valid and/or present in a series of discrete frames of image and/or video data because the methodology is capable of monitoring the position of objects upon detecting those objects, and continuously analyzing the detected objects to provide useful information.

From the user perspective, tracking typically is embodied in the form of a bounding border (e.g. box, as described herein) being maintained with respect to a detected object, even as the mobile device is moved in three-dimensional space during the capture operation (causing the detected object to apparently move from the perspective of the mobile device's reference point), and/or even as multiple objects are present in the field of view. Indeed, tracking is capable of monitoring any number of objects that may be defined according to characteristics such as set forth herein.

As will be appreciated by a skilled artisan upon reading the present disclosures, any of the raw and/or processed data, such as image data, video data, etc., may be associated with various metadata, may be associated with other raw or processed data, etc. Moreover, any of the presently disclosed functionalities may be applied to image capture and processing, video capture and processing, etc.

In a preferred approach, for example, tracking comprises one or more of: repositioning or redefining the bounding border to surround the periphery of the object in each of the frames where the tracked object is depicted within the viewfinder; and repositioning or redisplaying the indication that the object depicted in the viewfinder exhibits the one or more defining characteristics.

Optionally, the tracking further comprises receiving real-time feedback from the mobile device. The real-time feedback is based at least in part, and ideally based entirely, on one or more measurements performed using mobile device hardware components, for example any one or more of: a camera, an accelerometer, a gyroscope, and a clock.

According to some techniques, the real-time feedback may include stability feedback including an angle of orientation of the mobile device being within a predetermined orientation range; and a motion vector of the mobile device having a magnitude less than a predetermined threshold.

In another approach, the motion vector of the mobile device is determined based on real-time feedback received from the camera, and not determined based on feedback from the mobile device accelerometer. In short, the tracking techniques are capable of calculating a magnitude and direction of a velocity with which a camera is being moved through three-dimensional space independent of any change in acceleration. As a result, the device is freed from reliance on an accelerometer to determine motion vectors (such as would be the case with a constant velocity).

Yet another advantage conferred by use of video data with the present inventive techniques is the capacity to generate composite images from a plurality of frames. In one context, this advantage is leveraged as discussed below with respect to super-resolution, which may be used to clarify blurred or grainy regions of an otherwise high-quality image, for example.

In the additionally advantageous technique, composite image synthesis may be leveraged to effectively image an object that is otherwise too large to capture with sufficient detail for the desired application using image data alone. For example, consider the case of a long document such as a receipt or legal form. The document depicts a plethora of informative text, albeit in a relatively small size. In order to capture the entire document in a single image, a user would have to distance the document so far from the camera that the quality of the informative text would be so degraded that subsequent extraction and use of the information would be impractical or impossible.

Accordingly, it is an additional aspect of the presently disclosed inventive techniques that along document may be captured using video data, and the various frames of the video data may be "stitched" together to form a composite image depicting the entire object that was too large to fit in a single shot with sufficient clarity. Particularly preferred are embodiments where the composite image retains the high level of specificity and detail otherwise achievable only by zooming in on the object to an extent that capturing the entire object in a single image is impossible.

Put another way, in one approach the composite image is characterized by a height and a width. The composite image height is greater than or equal to a height of any single frame of the video data, and the composite image width is greater than or equal to a width of any single frame of the video data. Each of the synthesized frames of the video data depicts a portion of the object, and the composite image depicts the entire object.

Moreover still, synthesizing the composite image includes detecting a first feature (e.g. top border of a page) of the object depicted in the viewfinder; automatically initiating a capture operation in response to detecting the first border of the object capturing one or more of high-resolution image data and low-resolution video data via the automatically initiated capture operation; detecting a second feature e.g. bottom border of a page) of the object depicted in the viewfinder; capturing one or more of high-resolution image data and low-resolution video data via the automatically initiated capture operation; and automatically terminating the capture operation in response to detecting the second feature of the object.

According to the foregoing approach, for example, a user may initiate the stitching operation by capturing along document using a slow pan from top to bottom. As discussed in further detail above, windowed OCR may be particularly advantageous to utilize in combination with a stitching-based approach to capture, determine, analyze, etc. textual information depicted in a long document or other large object incapable of being captured with a desired level of detail or resolution in a single image or video frame. For example, in some approaches since a user will capture various partial images from which to form the composite image, and this capture process generally (but not necessarily) involves a relatively smooth, slow panning of the mobile device camera with respect to the object being imaged, it will be possible for the user to simultaneously capture the large object and perform some real-time (or near-real-time) windowed OCR in unison. The windowed OCR results may be utilized independently or in conjunction with any other defining characteristics of the object to determine characteristics of the object. For example, in one approach an object classification or pertinent information from the object may be determined contemporaneous to capturing the video and/or image data for subsequent use in generating the composite image.

In various approaches, a suspected object classification could be determined based on the defining characteristics of the object, and validated using windowed OCR results, e.g. presence of a feature, value or string known to be present in objects belonging to a particular classification. Similarly, an object classification could be determined solely based on windowed OCR results rather than using defining characteristics from the object as described above. Moreover still, in some embodiments both the defining characteristics of the object and the windowed OCR results may be taken into consideration when determining a classification of the object.

For example, in one approach an object classification may be determined independently based on (1) windowed OCR results and (2) the defining characteristics of the object. The independently determined results may be assigned a relative weight, confidence value, etc., and analyzed further in order to make an overall determination with respect to the object classification.

For instance, various object types may be more readily classified according to either textual information depicted on the object, or from defining characteristics of the object itself. Documents may, for example, be more readily or accurately classified based on textual information that may be determined using a windowed OCR approach, while objects depicting an identifying mark such as a logo, emblem, barcode, seal, etc. may be more readily or accurately classified based on defining characteristics such as object shape, contour, dimensions, color profile, etc. as would be understood by one having ordinary skill in the art upon reading the present descriptions.

Nonetheless, it may be useful to utilize multiple types of information in determining a classification of a particular object, even if it is known a priori that the object is more readily or accurately classified based on one specific type of information. In such cases, the form or forms of information that are known to produce facile, accurate, reliable classification of a particular object may be utilized to predict an object classification, and assigned a relative weight (e.g. defining characteristics as defined herein may be utilized and assigned a weight of 0.75 on a 0-to-1 scale).

Similarly, other form s) of information helpful in determining object classifications, but perhaps to a lesser degree than the preferred information type, may be utilized to predict the object classification, and assigned relatively low weights compared to the preferred information type (e.g. textual information determined by windowed OCR may be used to predict the object classification, and the prediction assigned a weight of 0.25 on a 0-to-1 scale).

Returning now to the concept of composite image synthesis, in order to determine whether and precisely how two images should be stitched to form the composite image, in one approach the synthesizing comprises: performing at least one homography transformation on two or more of the frames of the video data, and aligning at least portions of the two or more frames of the video data based at least in part on the homography transformations.

Several exemplary methods commensurate in scope with the present disclosures will now be discussed with particular reference to FIGS. 3 and 4. The exemplary embodiments presented below are not to be considered limiting on the scope of the instant disclosure, but rather are provided to illustrate possible implementations of the subject matter discussed herein.

Figure 3:
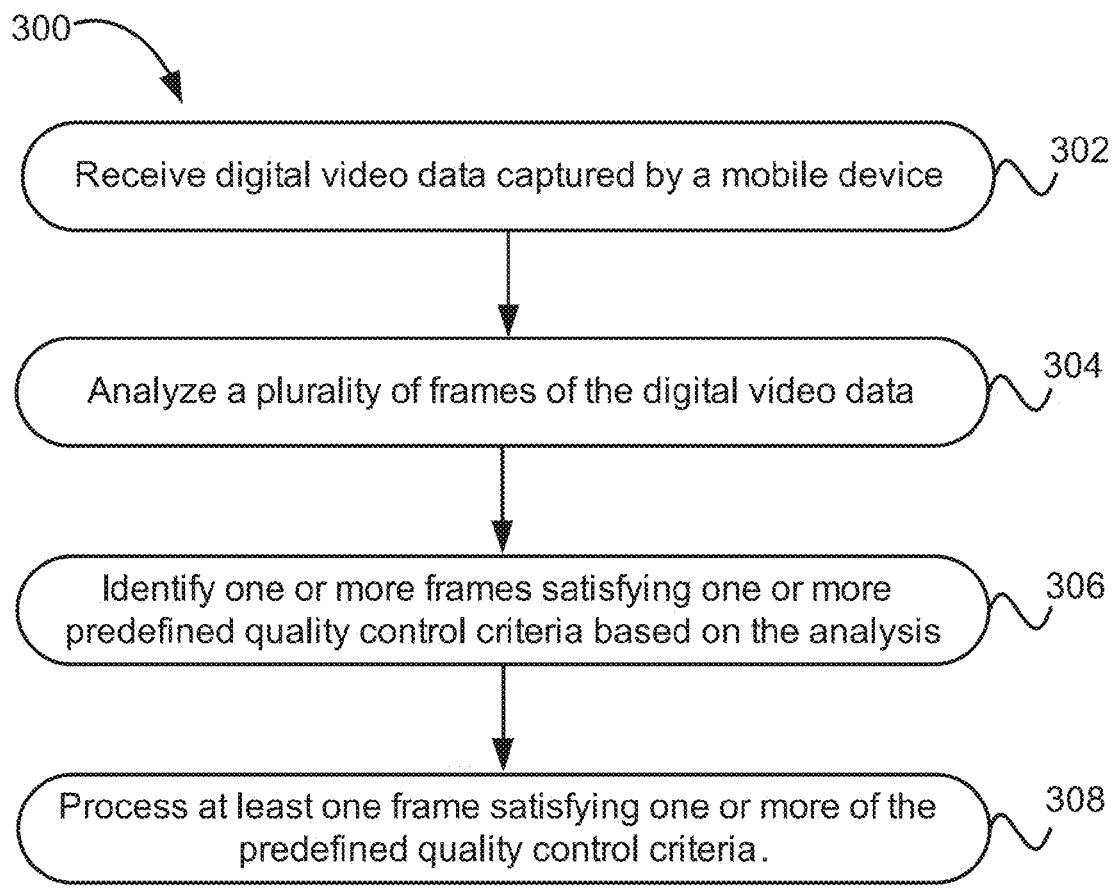
FIGS. 3-5 each depict a flowchart of a method, according to one embodiment.

Referring now to FIG. 3, a flowchart of a method 300 is shown, according to one embodiment. The method 300 may be performed in any suitable environment, such as those depicted above in FIGS. 1-2, among others. Moreover, the method 300 may include any number of additional and/or alternative operations aside from those specifically depicted in FIG. 3, in several approaches. The operations of method 300 may be performed in any suitable order that would be comprehended by one having ordinary skill in the art upon reading this disclosure.

In operation 302, digital video data captured by a mobile device is received.

Operations 304-308 may be performed using a processor, which in various embodiments may be a processor of the mobile device, a processor of a remote device such as a server or another mobile device, a processor of one or more resources of a cloud computing environment, etc. Operations 304-308 may be performed using any combination of such device(s) and/or processors thereof, in various embodiments.

In operation 304 a plurality of frames of the digital video data are analyzed.

In operation 306, one or more frames are identified based on the analysis, the identified frames satisfying one or more predefined quality control criteria.

In operation 308, at least one frame satisfying one or more of the predefined quality control criteria is processed.

In some approaches, predefined quality control criteria may include a minimum illumination level, e.g. an average illumination above a certain threshold; a maximum illumination level, e.g. an average illumination below a certain threshold; a minimum illumination evenness, e.g. an illumination deviation from some predefined value, from an average illumination, etc. being below a certain threshold; a minimum resolution; a minimum sharpness, e.g. an amount of blur below a certain threshold; and a minimum projection, i.e. the impact of projective effects such as angle of camera orientation, fish-bowling, etc. is below a certain threshold, which may be determined based on metadata collected during the capture operation or characteristics of the image.

Quality control criteria may further include, for example, a threshold visibility criterion or any other suitable indication of whether the document is wholly or partially visible), as may be embodied in a threshold number of expected edges, corners, or other defining features are discernable within the viewfinder region and/or are sufficiently within the viewfinder region (e.g. first embodiment is a binary yes/no, second embodiment is a further test to see if there is sufficient space around each edge of the object, etc. Further still, quality control criteria may in various approaches include a presence of glare; and an object classification.

For example, as a representation of a truly rectangular document may be analyzed to determine the rectangular "character" of the depicted document, which may appear trapezoidal due to imperfect capture angle. Images depicting a document whose appearance deviates too much from "rectangular" may be ignored. Determining whether a shape is substantially rectangular, such as a shape whose sides correspond to edges of a document, may be accomplished using any known means in the art, and in one embodiment may involve performing one or more transformations.

In more approaches, the method may additionally and/or alternatively include: determining whether the one or more frames satisfying the one or more predefined control criteria correspond to a high-resolution image stored on the mobile device; processing the high-resolution image upon determining the one or more frames satisfying the one or more predefined control criteria correspond to the high-resolution image. In other words, if a mobile device has a high resolution image of a document stored in memory, and a video stream captures a relatively low-resolution but otherwise acceptable frame or frames of the document, it may be preferable to utilize the high-resolution image in subsequent processing, but more computationally efficient to capture, analyze and/or pre-process the relatively low-resolution frame(s) corresponding to the high resolution image.

In various embodiments particularly directed to document processing, the digital video data comprises a digital representation of a document. In this scenario, the method may also include capturing the digital video data using a camera of the mobile device and detecting the digital representation of the document.

Some approaches including super-resolution capabilities as described herein may involve synthesizing at least a portion of two or more frames of the digital video data; and generating a composite image based on the synthesizing. At least a portion of the composite image is preferably characterized by a relatively higher resolution than a resolution of any of the two or more frames of the digital video data from which the composite image was synthesized. The composite image may be utilized to perform document detection (or object discovery in the case of objects other than documents).

Selective Auto-Capture

Figure 4:
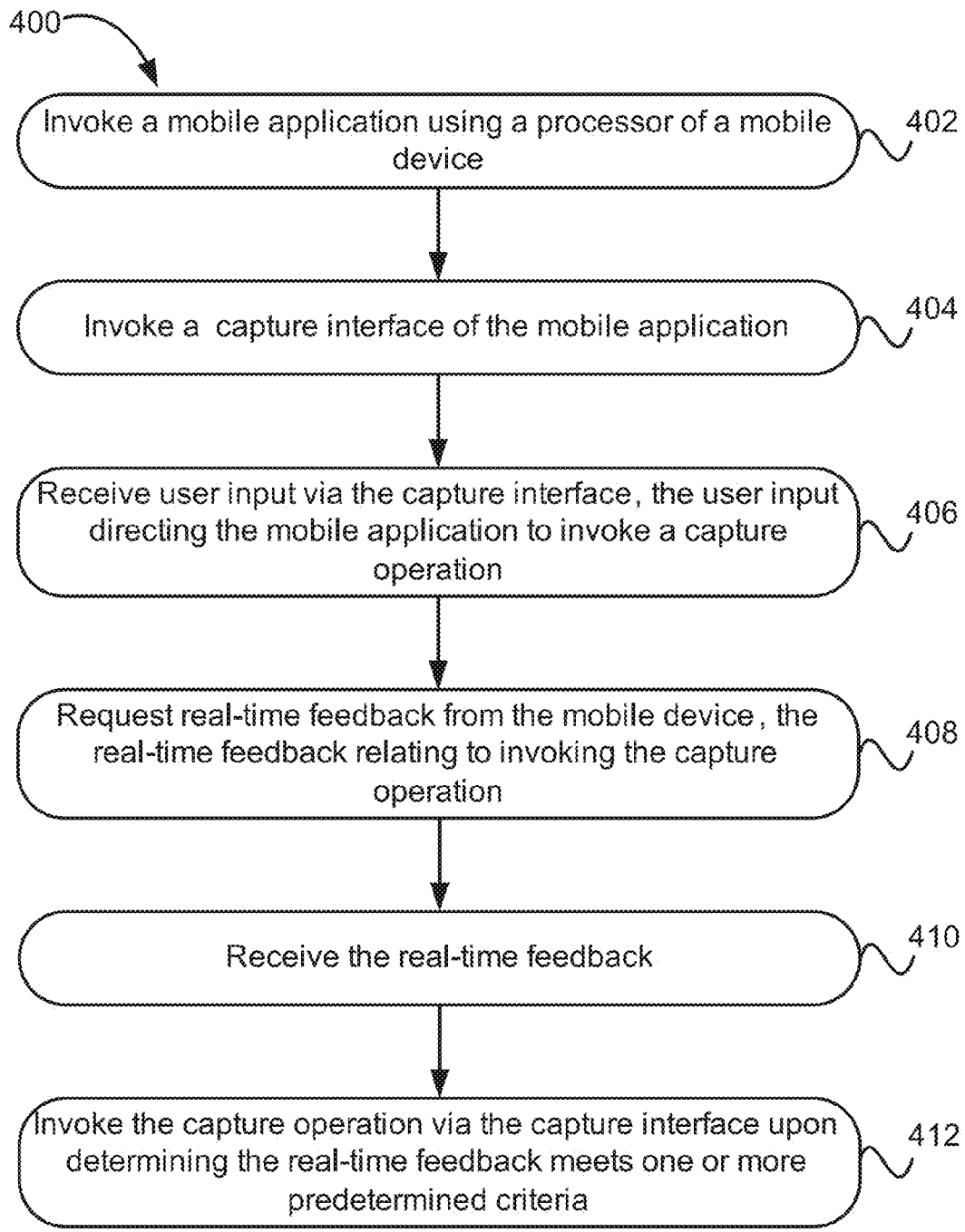

Also within the scope of the present disclosure is selective auto-capture functionality, which in one embodiment may be implemented in whole or in part as a method, such as method 400, shown in FIG. 4. The method 400 may be performed in any suitable environment, such as those depicted above in FIGS. 1-2, among others. Moreover, the method 400 may include any number of additional and/or alternative operations aside from those specifically depicted in FIG. 4, in several approaches. The operations of method 400 may be performed in any suitable order that would be comprehended by one having ordinary skill in the art upon reading this disclosure.

In operation 402, a mobile application is invoked using a processor of a mobile device. The mobile application may be invoked in any suitable manner, such as by interacting with a user interface of the mobile device, issuing a voice command, pressing a button, etc.

In operation 404, a video capture interface of the mobile application is invoked. The video capture interface may be invoked expressly by a user, for example by interacting with a button or user interface displayed on the mobile device screen. Alternatively, the video capture interface may be invoked automatically, either as part of a predetermined routine, in response to a precondition being satisfied (such as a prior process completing execution), etc., in various approaches.

In operation 406, user input is received via the capture interface. The user input may preferably direct the mobile application to invoke a capture operation, for example using a capture component of a mobile device.

In operation 408, real-time feedback is requested via the mobile device. The real-time feedback may relate to any relevant portion of video capture and/or processing, and in one preferred embodiment real-time feedback relates to invoking the capture operation, such as one or more characteristics of data captured via the capture operation, parameters for performing the capture operation, characteristics of a capture component to be used in performing a capture operation, such as an orientation and/or acceleration of a mobile device (which may be determined using integrated hardware components such as a gyroscope, an accelerometer, etc.), information regarding the result of a capture operation, suitability of captured data for subsequent processing, etc.

In one particular embodiment, operation 408 includes requesting stability information from one or more hardware components integrated into the mobile device. The capture interface transparently requests mobile device acceleration data from an integrated accelerometer in response to receiving the user input directing the capture interface to invoke the capture operation. The capture interface may also transparently request mobile device orientation data from an integrated gyroscope in response to receiving the user input directing the capture interface to invoke the capture operation. Upon receiving the requested acceleration data and orientation data, the data are compared to predefined stability-threshold criteria previously determined to correspond to notability condition, i.e. conditions that typically result in capturing image and/or video data of sufficient quality for downstream processing. The comparison result may be utilized to determine whether the stability condition exists, and data may be captured only upon determining the stability condition exists to maximize the probability that any image captured via the capture interface is suitable for the desired downstream processing.

In operation 410, real-time feedback is received. As described in further detail below, the real-time feedback may be utilized to facilitate capturing video and/or image data under conditions likely to result in the video and/or image data being of sufficient quality for downstream processing. For example, real-time feedback may be utilized to ensure adequate illumination during capture, to minimize blur, glare, streaking, etc. to ensure the video and/or image data captures an appropriate object or object type, etc.

In operation 412, a capture operation is invoked via the capture interface upon determining the real-time feedback meets one or more predetermined criteria.

Real-time feedback is preferably based at least in part on one or more measurements performed using one or more integrated hardware components of the mobile device. Exemplary integrated hardware components include one or more of a camera, an accelerometer, a gyroscope, and a clock, but may include any hardware component integrated into a mobile device. Moreover, the real-time feedback may be in whole or in part an indication that a document is in a field of view of the camera integrated into the mobile device.

In a particularly preferred approach, the real-time feedback comprises stability feedback, such as an angle of orientation of the mobile device; an acceleration vector of the mobile device (e.g. a magnitude and a direction of acceleration per unit time of the mobile device), illumination of a field of view of the camera, illumination of a target object in the field of view of the camera, presence of glare in a field of view of the camera, etc. as would be understood by one having ordinary skill in the art upon reading the present descriptions. In one embodiment, illumination may be indicated by and/or derived from a minimum, maximum, average, or other statistical information regarding video stream and/or image intensity, brightness, etc., which may be obtained from the camera directly and/or with minimal preprocessing during the video stream capture, in various approaches. Similarly, glare may be indicated by one or more regions of the field of view being oversaturated. Oversaturation may be determined substantially as disclosed in related U.S. patent application Ser. No. 13/740,123.

Various implementations may utilize predetermined criteria such as the angle of orientation of the mobile device being within a predetermined orientation range; and the acceleration vector of the mobile device having a magnitude less than a predetermined threshold.

In one approach, invoking the capture operation includes invoking an autofocus operation using a camera of the mobile device; invoking an autoflash operation using the camera; and invoking a data acquisition operation using the camera.

In further approaches, data acquisition may include capturing data comprising one or more of a still image and digital video. The data may be or comprise a digital representation of a document, or a digital representation of a plurality of documents.

Still more embodiments within the scope of this disclosure may additionally and/or alternatively include determining whether the one or more predefined criteria are satisfied; and determining whether the capture operation captured data corresponding to the one or more predefined criteria being satisfied in response to determining the one or more predefined criteria are satisfied. For example, one embodiment may include determining that the mobile device captured data under conditions where the predefined criteria were satisfied, such as a minimum stability, proper angle of orientation, minimum movement in a particular direction, etc. as would be understood by one having ordinary skill in the art upon reading the present descriptions.

Exemplary methods within the scope of the instant descriptions may further encompass outputting an indication to the user via a display of the mobile device in response to determining the capture operation captured data corresponding to the one or more predefined criteria being satisfied. The indication preferably indicates the capture operation captured data corresponding to the one or more predefined criteria being satisfied. In one embodiment, the mobile device may display a bounding border, box or other overlaying shape around an object depicted in the mobile device camera's field of view.

The bounding box may change color upon determining that the capture operation has completed and captured data under conditions where the predefined criteria were satisfied. In one approach, the mobile device displays a white bounding box before detecting the object in the camera's field of view, a yellow bounding box upon detecting the object but before completing the capture operation under the desired conditions, and a green bounding box upon completing the capture operation under the desired conditions or a red bounding box upon failing to complete the capture operation under the desired conditions.

In this manner the user may be advantageously informed when to cease attempting to capture data via the capture interface of the mobile application and/or whether it will be necessary to repeat the capture operation for any object in the camera's field of view. Of course, in other embodiments where multiple documents are within the camera's field of view, the display may display several bounding boxes.

In another embodiment, the one or more bounding boxes may change in color in response to determining whether one or more of multiple documents within the camera's field of view have been recently captured and/or processed. For example, in one approach where a camera's field of view encompasses several objects such as documents, desirable capture conditions for each object may be achieved at a different point in time or several different points in time. Accordingly, it may be advantageous to determine when an object in the field of view has been captured according to desirable capture conditions, and cease attempting to capture that object while continuing to attempt capturing other object not yet captured under the desired capture conditions. Similarly, once all objects have been captured under the desired capture conditions, it may be useful to provide feedback indicating that all objects depicted in the field of view have been captured according to the desired capture conditions and the capture operation may be ceased.

In still another embodiment, where a camera's field of view encompasses several objects such as documents it may be advantageous to exclude or ignore objects in the course of the capture operation, for example if the object has been previously captured under suitable conditions or if the object has been previously processed by and/or according to processing intended to be performed using the data currently being captured.

An exemplary use case scenario will now be described, according to several embodiments. Those having ordinary skill in the art will appreciate upon reading these descriptions that the exemplary use case is provided for illustrative purposes, and is not intended to be limiting in any way. Other use cases are fully within the scope of the present descriptions, and may include utilizing any combination of features disclosed herein in any manner.

Figure 5:
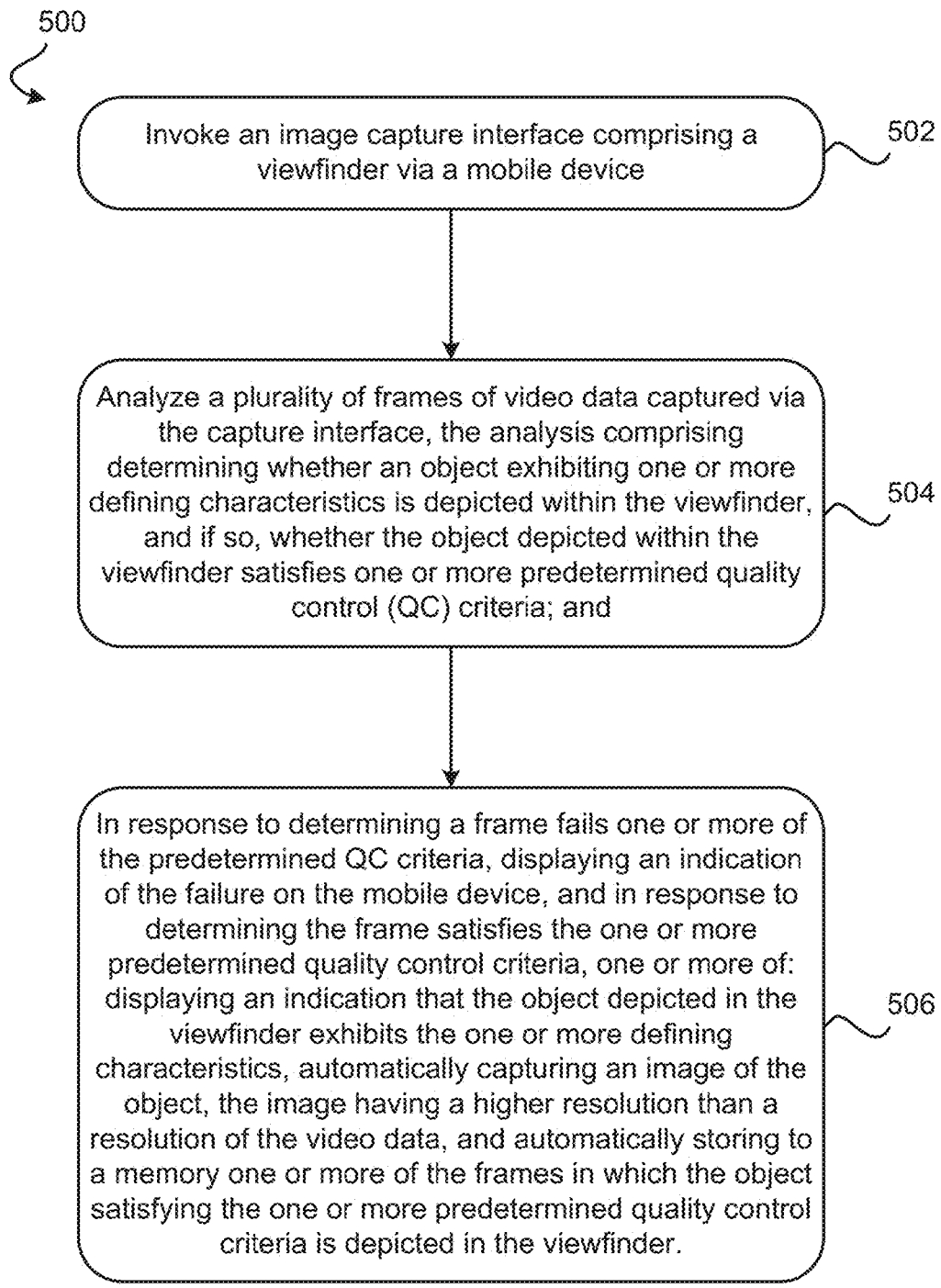

According to the exemplary use case scenario, the presently disclosed inventive concepts are embodied in a methodology substantially as represented by method 500 as shown in FIG. 5. The method 500 may be performed in any suitable environment disclosed herein or as would be appreciated by one having ordinary skill in the art upon reading the present descriptions.

As shown in FIG. 5, method 500 includes operation 502, where a capture interface is invoked via a mobile device. The capture interface includes a viewfinder, preferably a rectangular viewfinder defined by a targeting reticle displayed via the mobile device.

Method 500 also includes operation 504, where a plurality of captured video data frames are analyzed to determine (1) whether an object exhibiting predetermined defining characteristics is wholly or partially depicted in the viewfinder region, and (2) whether the object satisfies quality control criteria. Defining characteristics and quality control criteria may include any feature as described herein, preferably those characteristics discussed above and in the related applications incorporated by reference with respect to image or object classification. Feature vectors represent data particularly suitable for use as "defining characteristics."

According to method 500, and depending on whether the object exhibits the defining Characteristics and satisfies quality control criteria, one or more responsive actions are taken in operation 506.

If the aforementioned criteria are met (object detected, quality acceptable), then an indication of this detection and/or quality status may be displayed to the user, e.g. via the device display. Preferably, these indications are displayed in real- or near-real time as the image analysis and/or processing are conducted.

On the other hand, if an object is not detected, or does not satisfy the quality control criteria, an indication of the failure(s) may similarly be displayed via the mobile device.

Further still, one or more images may be captured at a resolution higher than the resolution of the video data frames (to provide more and/or better raw data) and processed or stored. Similarly, those frames of video in which the object was depicted in the viewfinder and satisfies the quality control criteria may be archived, flagged, preserved stored to memory, etc. as would be understood by one having ordinary skill in the art upon reading the present descriptions.

The method 500 may also feature one or more additional and/or alternative operations, in several approaches. For example, in one approach the captured image(s) and/or video frame(s) may be further processed. For example, processing may include classifying object(s) depicted in the image(s) and/or frame(s), extracting data from those object(s), tracking objects depicted in a video stream in real-time, displaying pertinent information to a user, etc.

Moreover, in particularly preferred embodiments, the presently disclosed techniques are fully capable of simultaneously performing any of the disclosed processing operations in near-real time as a video stream is captured, and furthermore capable of simultaneously performing the capture, analysis, and/or processing techniques disclosed herein in real-time or near-real time for multiple objects depicted within a single video stream (or image). This parallel, real-time functionality should be understood to apply equally to the operations discussed above with reference to FIG. 5, in various approaches.

In another use case illustration, a user starts a mobile application on their mobile device. The user is presented the option to invoke an optional module such as an "auto-assist" module or a "Mobile Capture Wizard" to assist the user in capturing high quality image data for subsequent processing. The user may interact with a button displayed on the mobile device display to invoke the optional "auto-assist" module or "Mobile Capture Wizard," for example. Alternatively, the module may be programmatically invoked or preset by the user, for example in a "settings" interface of the mobile capture application. In this use case, the user invokes the Mobile Capture Wizard.

Upon invoking the Mobile Capture Wizard, the user is presented with an interface via the mobile device display, the interface including several buttons which permit the user to selectively capture either in a "Photo" mode or a "Video" mode. The user interacts with the "Video" button indicating to the mobile application that the user wishes to capture a video stream. Alternatively, the capture mode may be programmatically invoked or preset by the user, for example in a "settings" interface of the mobile capture application.

After indicating the desire to capture a video stream, the user may interact with a camera button. In response, the Mobile Capture Wizard queries the device accelerometer and/or gyroscope to determine device orientation, and if the device is not oriented substantially as desired, (e.g. parallel to a flat, horizontal surface such as a desk, the ground, etc. for a document, or parallel to a vertical surface such as a poster, automobile surface depicting a Vehicle Identification Number, etc.), user feedback may be presented to the user via the mobile device display, e.g. in the form of a transparent screen, the feedback indicating improper device orientation. The user feedback may overlay the capture interface viewport so that the user cannot capture an image until proper device orientation is achieved. Proper device orientation may be programmatically determined and/or preset by a user to include any device orientation (e.g. as an angle) in a settings interface.

As the user moves the orientation of the device to a "desired orientation," the mobile application periodically queries the device accelerometer and/or gyroscope to determine the actual orientation of the device. During this operation an on-screen user feedback is displayed indicating to the user how the orientation of the device should be adjusted for optimal capture orientation.

Once the orientation falls within a predetermined tolerance range for aspect ratio correction and normalization, the transparent overlay screen disappears and the mobile application begins analyzing, in real-time, video data gathered from the mobile device camera to detect page boundaries.

Upon detecting page boundaries, the mobile device optionally again periodically checks for device stability, and upon determining that the device is sufficiently stable according to predetermined tolerance thresholds, additional user feedback is provided indicating suitable conditions exist for capturing the detected page. For example, user feedback may be provided in the form of a yellow bounding box displayed around the detected page boundaries.

Whether or not the optional second orientation and/or stability detection operation is performed, upon determining that the device is stable, properly oriented, and a page has been detected, user feedback is displayed via the mobile device display to indicate conditions suitable for capturing high-quality image data exist. The mobile application then proceeds automatically to capturing the image of the document depicted in the capture interface viewport.

The mobile application capture then forces an auto-focus operation using the device camera, and captures the video frame containing the detected page, which may be a high resolution version, if available, of the original video frame containing the detected page. Alternatively, one or more video frames, including the relatively low-resolution original video frame in which the page was detected may be captured. The mobile application displays the captured image in real-time, either directly in the capture interface or in another interface displayed on the mobile device display after completing the high-resolution capture operation.

Full image processing which may include any or all of the image processing operations disclosed in the related U.S. patent applications referenced above) is initiated by the mobile application as a background, asynchronous thread. In addition, a quality control process module is simultaneously initiated and an on screen indication is given as feedback regarding document illumination and/or blur. Once the asynchronous background processing is complete, the displayed image is refreshed (e.g. top to bottom on the mobile device display) with the processed image. Notably, the image processing may be performed using a processor of the mobile device, a processor of a remote device such as a server, or any combination thereof.

The mobile application may either automatically save the original and processed image, or prompt a user for instructions regarding whether to save the original and/or processed image, and save the images indicated by the user accordingly. The data may be synchronized with a host cloud or on-premises system for storage, further processing and/or subsequent re-use.

In various embodiments, saving the image, whether the original image, processed image, or any variations thereof, may include saving a file combined with any image-related metadata, such as classification results, extraction results, or any environmental metadata such as geo-position tagging, date/time stamping, etc. all within one single file (e.g. a printable document format (PDF) e-form). This type of save operation may be optionally invoked by the user in real-time or in a settings interface. Alternatively, the image data may be saved as-is without being associated with metadata.

Various embodiments may additionally and/or alternatively include displaying a capture result preview via a display of the mobile device and receiving user input in response to the capture preview. Moreover, in at least one embodiment the preview depicts at least one object captured via the capture operation.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

For example, in myriad illustrative approaches, a method, a system configured to execute logic and perform a method, and/or a computer program product comprising computer readable instructions configured to cause a processor to perform a method may include any one or more of the following features. Similarly, various embodiments may exclude some or all of the features set forth below. In general, the following features may be combined in any suitable manner that would be appreciated by one having ordinary skill in the art upon reading the present descriptions.

Again, a method, system, and/or computer program product may include any combination of: invoking an image capture interface via a mobile device, the capture interface comprising a viewfinder represented on a display of the mobile device; and analyzing a plurality of frames of video data captured via the capture interface. The analyzing may include determining: Whether an object exhibiting one or more defining characteristics is depicted within the viewfinder; and if so, whether the object depicted within the viewfinder satisfies one or more predetermined quality control criteria. In response to determining a frame fails one or more of the predetermined quality control criteria, the method/system/computer program may include displaying an indication of the failure on the mobile device display. The failure indication preferably identifies the one or more quality control criteria not satisfied by the frame(s), and optionally includes abounding border substantially surrounding a periphery of the object within the viewfinder. In response to determining the object depicted within the viewfinder satisfies the one or more predetermined quality control criteria, the method/system/computer program may include one or more of displaying an indication that the object depicted in the viewfinder exhibits the one or more defining characteristics; automatically capturing an image of the object, wherein the image is characterized by a resolution higher than a resolution of the video data; and automatically storing to a memory one or more of the frames in which the object satisfying the predetermined quality control criteria is depicted in the viewfinder. Preferably, the success indicator specifically identifies object classification, and optionally includes a bounding border substantially surrounding a periphery of the object within the viewfinder. In some approaches, the object comprises a document having one or more pages, or multiple documents each having one or more pages. The method/system/computer program may include processing at least one of the automatically captured image and the automatically stored frame(s) at least in part using a processor of the mobile device. The processing includes tracking the object depicted within the viewfinder in real-time or near-real-time; classifying the object depicted within the viewfinder; and/or extracting data from the object depicted in the viewfinder. Processing is optionally performed with respect to at least two of the multiple documents or multiple pages, when present; e.g. tracking, classifying and/or extracting may be performed simultaneously with respect to one another and/or multiple documents or pages of a single document. The simultaneous processing may preferably be conducted across multiple frames of the video data: Classifying may more specifically include: determining one or more defining characteristics of the object depicted within the viewfinder; and comparing the one or more determined defining characteristics to defining characteristics of each of a plurality of object classifications. In some situations, the method/system/computer program includes either: determining an object classification based at least in part on the comparison; or determining the object does not correspond to any of the plurality of object classifications based at least in part on the comparison. In response to determining the object does not correspond to any of the plurality of object classifications the method/system/computer program includes: requesting user input relating to the object receiving the user input; defining a new object classification based at least in part on the user input; and assigning the object to the new object classification. Similarly, tracking may include one or more of: repositioning or redefining the bounding border to surround the periphery of the object in each of the frames where the object is depicted within the viewfinder; repositioning or redisplaying the indication that the object depicted in the viewfinder exhibits the one or more defining characteristics; and receiving real-time feedback from the mobile device, the real-time feedback being based at least in part on one or more measurements performed using one or more mobile device components selected from: a camera, an accelerometer, a gyroscope, and a clock. Preferably, the real-time feedback includes stability feedback including an angle of orientation of the mobile device being within a predetermined orientation range; and a motion vector of the mobile device having a magnitude less than a predetermined threshold. The motion vector, in some approaches is determined based on real-time feedback received from the camera, and is not determined based on feedback from an accelerometer. In some approaches, particularly those involving tracking or processing of long/large objects, the method/system/computer program also includes synthesizing at least a portion of two or more frames of the video data; and generating a composite image based on the synthesis. The composite image is optionally characterized by a height and a width, and the composite image height is greater than or equal to a height of any single frame of the video data, and/or the composite image width is similarly greater than or equal to a width of any single frame of the video data. Each of the synthesized frames of the video data ideally depicts a portion of the object, while the composite image depicts an entirety of the object. Synthesizing the composite image from the various video data frames preferably includes: detecting a first feature of the object depicted in the viewfinder; automatically initiating a capture operation in response to detecting the first border of the object; capturing one or more of high-resolution image data and low-resolution video data via the automatically initialed capture operation; detecting a second feature of the object depicted in the viewfinder; capturing one or more of high-resolution image data and low-resolution video data via the automatically initiated capture operation; and automatically terminating the capture operation in response to detecting the second feature of the object. Synthesizing may also, or instead, include performing at least one homography transformation on two or more of the frames of the video data, and aligning at least portions of the two or more frames of the video data based at least in part on the homography transformations. The object imaged using the aforementioned synthesizing techniques to form a composite is preferably a document characterized by at least one dimension thereof being too large to encompass the entire document within the viewfinder, and simultaneously preserve a desired minimum resolution of the document, e.g. a resolution sufficient to resolve textual information depicted in the document. Moreover still, at least a portion of the composite image may be characterized by a higher resolution than a resolution of any of the two or more frames of the digital video data. This result may be accomplished, in some embodiments, using a "super-resolution" technique as described herein, and may further include detecting the object in the composite image based at least in part on the portion of the composite image characterized by the higher resolution. Determining whether the one or more frames satisfying the one or more predefined control criteria correspond to a high-resolution image stored on the mobile device is another useful feature; and may be used to retrieve previously captured and stored high-resolution images, as well as process the stored high-resolution image(s). It may be useful in some scenarios to associate metadata with stored image and/or video data. In preferred approaches, predetermined quality control criteria may include any one or more of: a minimum illumination level; a maximum illumination level; a minimum illumination evenness; a minimum resolution; a minimum sharpness; a minimum projection angle; a maximum projection angle; a threshold visibility criterion; a presence of glare; and an object classification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method, comprising:
receiving image data via a mobile device, the image data comprising a plurality of frames; and
generating a composite image based on at least two of the plurality of frames;
determining whether one or more of the frames depict an object exhibiting one or more defining characteristics; and
in response to determining one or more of the frames depict the object, setting a minimum capture resolution for capturing other objects exhibiting the one or more defining characteristics.

2. The method as recited in claim 1, wherein the at least two of the plurality of frames are each characterized by a reduced resolution; and wherein the composite image is characterized by a higher resolution.

3. The method as recited in claim 2, wherein the higher resolution is at least about 1000 pixels by about 1000 pixels.

4. The method as recited in claim 1, wherein the at least two of the plurality of frames are each characterized by a blurred region; and
wherein the composite image is characterized by an absence of the blurred region.

5. The method as recited in claim 4, wherein a location of the blurred region in each of the at least two of the plurality of frames is the same; and
wherein a location of the absence of the blurred region in the composite image is the same as the location of the blurred region in each of the at least two of the plurality of frames.

6. The method as recited in claim 1, wherein each of the at least two of the plurality of frames comprises binary image data, and the method comprising one or more of comparing and extracting data from one or more of the composite image and the at least two of the plurality of frames.

7. The method as recited in claim 6, wherein the data comprises text characters.

8. The method as recited in claim 1, comprising capturing the image data, wherein the image data comprise video data.

9. The method as recited in claim 1, wherein each of the plurality of frames is characterized by a different resolution ranging from about 25 pixels by about 25 pixels to about 256 pixels by about 256 pixels.

10. The method as recited in claim 9, comprising determining whether one or more of the frame(s) determined to depict the object satisfy one or more predetermined quality control criteria.

11. The method as recited in claim 10, wherein the predetermined quality control criteria are selected from a group consisting of: a minimum illumination level; a maximum illumination level; a minimum illumination evenness; a minimum resolution; a minimum sharpness; a minimum projection; a glare presence; and a classification of the object.

12. The method as recited in claim 10, comprising determining whether the one or more frames satisfying the one or more predefined control criteria correspond to a high-resolution image stored on the mobile device; and
processing the high-resolution image upon determining the one or more frames satisfying the one or more predefined control criteria correspond to the high-resolution image.

13. The method as recited in claim 1, comprising receiving user feedback confirming or negating whether the one or more frames depict the object, wherein the minimum capture resolution is set in further response to determining the user feedback confirms the one or more frames depict the object.

14. The method as recited in claim 1, wherein the minimum capture resolution is at least as high as a lowest resolution of the one or more frames determined to depict the object.

15. A computer program product comprising: a non-transitory computer readable storage medium having program code embodied therewith, the program code readable/executable by a processor to:
receive image data via a mobile device, the image data comprising a plurality of frames;
generate a composite image based on at least two of the plurality of frames;
determine whether one or more of the frames depict an object exhibiting one or more defining characteristics; and
in response to determining one or more of the frames depict the object, set a minimum capture resolution for capturing other objects exhibiting the one or more defining characteristics.

16. The computer program product as recited in claim 15, wherein the at least two of the plurality of frames are each characterized by a reduced resolution; and
wherein the composite image is characterized by a higher resolution.

17. The computer program product as recited in claim 15, wherein the at least two of the plurality of frames are each characterized by a blurred region; and
wherein the composite image is characterized by an absence of the blurred region.

18. The computer program product as recited in claim 15, wherein the minimum capture resolution is at least as high as a lowest resolution of the one or more frames determined to depict the object.

19. The computer program product as recited in claim 15, wherein the at least two of the plurality of frames are each characterized by a blurred region;
wherein the composite image is characterized by an absence of the blurred region
wherein a location of the blurred region in each of the at least two of the plurality of frames is the same; and
wherein a location of the absence of the blurred region in the composite image is the same as the location of the blurred region in each of the at least two of the plurality of frames.

20. A computer-implemented method, comprising:
receiving image data via a mobile device, the image data comprising a plurality of frames; and
generating a composite image based on at least two of the plurality of frames;

wherein the at least two of the plurality of frames are each characterized by a blurred region;

wherein the composite image is characterized by an absence of the blurred region;

wherein a location of the blurred region in each of the at least two of the plurality of frames is the same; and wherein a location of the absence of the blurred region in the composite image is the same as the location of the blurred region in each of the at least two of the plurality of frames.

* * * * *

UNITED STATES PATENT AND TRADEMARK OFFICE
CERTIFICATE OF CORRECTION

PATENT NO. : 9,584,729 B2  
APPLICATION NO. : 14/981759  
DATED : February 28, 2017  
INVENTOR(S) : Jan W. Amtrup et al.

Page 1 of 1

It is certified that error appears in the above-identified patent and that said Letters Patent is hereby corrected as shown below:

In the Specification

Column 3, Line 61 please replace "modify anew or" with --modify a new or--;
Column 4, Line 31 please replace "metadata. GPS information," with --GPS metadata, information,--;
Column 4, Line 66 please replace "images coining from" with --images coming from--;
Column 5, Line 51 please replace "wireless e.g., radio" with --wireless (e.g., radio--;
Column 7, Line 6 please replace "104, 106, 1.08," with --104, 106, 108,--;
Column 7, Line 60 please replace "and/or mutation may be" with --and/or emulation may be--;
Column 7, Line 65 please replace "a "cloud," In" with --a "cloud." In--;
Column 9, Line 18 please replace "user e.g. to OCR" with --user (e.g. to OCR--;
Column 9, Line 20 please replace "position e.g. a" with --position (e.g. a--;
Column 15, Line 60 please replace "that along document" with --that a long document--;
Column 16, Line 15 please replace "the object capturing one" with --the object; capturing one--;
Column 16, Line 17 please replace "second feature e.g." with --second feature (e.g.--;
Column 16, Line 25 please replace "capturing along" with --capturing a long--;
Column 17, Line 23 please replace "other form s) of" with --other form(s) of--;
Column 19, Line 63 please replace "notability condition," with --a stability condition,--;
Column 22, Line 25 please replace "defining Characteristics and" with --defining characteristics and--;
Column 24, Line 7 please replace "processing which may" with --processing (which may--;
Column 25, Line 5 please replace "determining: Whether an object" with --determining whether an object--;
Column 25, Line 15 please replace "includes abounding border" with --includes a bounding border--;
Column 26, Line 32 please replace "automatically initialed capture" with --automatically initiated capture--.

Signed and Sealed this
First Day of May, 2018

Andrei Iancu
*Director of the United States Patent and Trademark Office*